(12) United States Patent 
Black et al.

(10) Patent No.: US 6,974,947 B2
(45) Date of Patent: Dec. 13, 2005

(54) APPARATUS AND METHOD FOR SENSING ROTATION BASED ON MULTIPLE SETS OF MOVEMENT DATA

(75) Inventors: Robert A. Black, Milpitas, CA (US); Michael J. Brosnan, Fremont, CA (US); Roopinder Singh Grewal, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 22 days.

(21) Appl. No.: 10/118,623

(22) Filed: Apr. 8, 2002

(65) Prior Publication Data

US 2003/0189166 A1 Oct. 9, 2003

(51) Int. Cl.[7] .............................. G06M 7/00; H01J 40/14
(52) U.S. Cl. ........................................ 250/221; 345/166
(58) Field of Search ................................. 250/221, 234, 250/208.1, 208.2, 557, 29, 559, 44; 345/158, 163, 165–166, 157–169

(56) References Cited

U.S. PATENT DOCUMENTS

| | | | | |
|---|---|---|---|---|
| 5,142,655 A | * | 8/1992 | Drumm | 379/52 |
| 5,298,919 A | * | 3/1994 | Chang | 345/163 |
| 5,477,237 A | * | 12/1995 | Parks | 345/156 |
| 5,578,813 A | | 11/1996 | Allen et al. | |
| 5,644,139 A | | 7/1997 | Allen et al. | |
| 5,786,804 A | | 7/1998 | Gordon | |
| 5,994,710 A | * | 11/1999 | Knee et al. | 250/557 |
| 6,057,540 A | | 5/2000 | Gordon et al. | |
| 6,151,015 A | | 11/2000 | Badyal et al. | |
| 6,281,882 B1 | | 8/2001 | Gordon et al. | |
| 6,618,038 B1 | * | 9/2003 | Bohn | 345/164 |
| 6,657,184 B2 | * | 12/2003 | Anderson et al. | 250/221 |

OTHER PUBLICATIONS

"Apparatus and Method for Three–Dimensional Relative Movement Sensing", U.S. Appl. No. 10/004,512, filed Oct. 26, 2001.

* cited by examiner

Primary Examiner—David Porta
Assistant Examiner—Patrick J. Lee

(57) ABSTRACT

An apparatus for sensing rotation includes a plurality of motion sensors constructed in a substantially coplanar arrangement. The plurality of motion sensors is each configured to generate incremental movement data indicative of movement of the sensor in two dimensions. A rotation data generator generates rotation data based on the incremental movement data. The rotation data represents rotation of a first one of the motion sensors about a second one of the motion sensors.

28 Claims, 30 Drawing Sheets

| Alignment | Orientation | | | |
|---|---|---|---|---|
| | General | #1 | #2 | #3 |
| Normal | 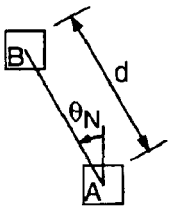 | 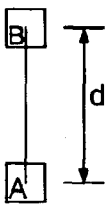 | 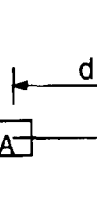 | 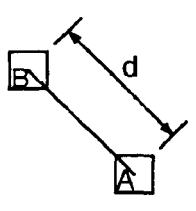 |
| Horizontal Mirror | 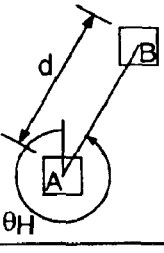 | | 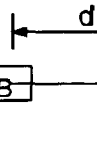 | 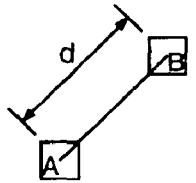 |
| Vertical Mirror | 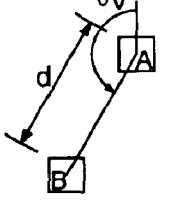 | 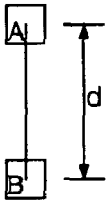 | | 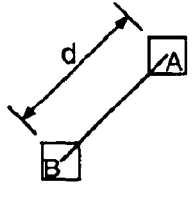 |
| Horizontal and Vertical Mirror | 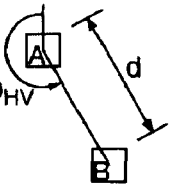 | | | 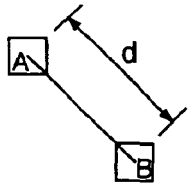 |
Fig. 3

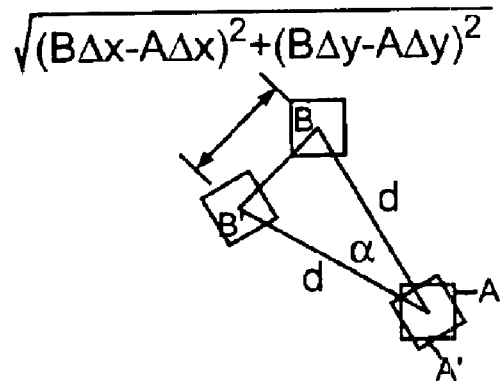
Fig. 14
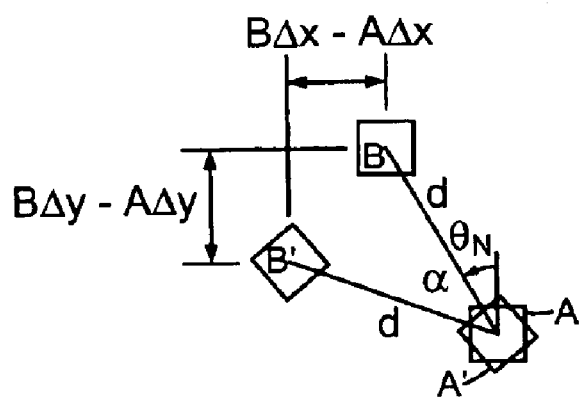 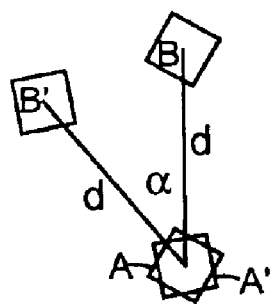
Fig. 15A   Fig. 15B

APPARATUS AND METHOD FOR SENSING ROTATION BASED ON MULTIPLE SETS OF MOVEMENT DATA

REFERENCE TO RELATED PATENTS

This Application is related to the subject matter described in the following U.S. patents: U.S. Pat. No. 5,578,813, filed Mar. 2, 1995, issued Nov. 26, 1996, and entitled FREEHAND IMAGE SCANNING DEVICE WHICH COMPENSATES FOR NON-LINEAR MOVEMENT; U.S. Pat. No. 5,644,139, filed Aug. 14, 1996, issued Jul. 1, 1997, and entitled NAVIGATION TECHNIQUE FOR DETECTING MOVEMENT OF NAVIGATION SENSORS RELATIVE TO AN OBJECT; U.S. Pat. No. 5,786,804, filed Oct. 6, 1995, issued Jul. 28, 1998, and entitled METHOD AND SYSTEM FOR TRACKING ATTITUDE; U.S. Pat. No. 6,057,540, filed Apr. 30, 1998, issued May 2, 2000, and entitled MOUSELESS OPTICAL AND POSITION TRANSLATION TYPE SCREEN POINTER CONTROL FOR A COMPUTER SYSTEM; U.S. Pat. No. 6,151,015, filed Apr. 27, 1998, issued Nov. 21, 2000, and entitled PEN LIKE COMPUTER POINTING DEVICE; U.S. Pat. No. 6,281,882, filed Mar. 30, 1998, issued Aug. 28, 2001, and entitled PROXIMITY DETECTOR FOR A SEEING EYE MOUSE; and U.S. patent application Ser. No. 10/004,512, filed Oct. 26, 2001, and entitled APPARATUS AND METHOD FOR THREE-DIMENSIONAL RELATIVE MOVEMENT SENSING.

THE FIELD OF THE INVENTION

This invention relates generally to motion sensor devices. This invention relates more particularly to a motion sensor device for sensing rotation.

BACKGROUND OF THE INVENTION

The use of a hand operated pointing device for use with a computer and its display has become almost universal. By far the most popular of the various devices is the conventional (mechanical) mouse, used in conjunction with a cooperating mouse pad. Centrally located within the bottom surface of the mouse is a hole through which a portion of the underside of a rubber-surfaced steel ball extends. Interior to the mouse are rollers, or wheels, that contact the ball at its equator and convert its rotation into electrical signals representing orthogonal components of mouse motion. These electrical signals are coupled to a computer, where software responds to the signals to change by a ΔX and a ΔY the displayed position of a pointer (cursor) in accordance with movement of the mouse.

In addition to mechanical types of pointing devices, such as a conventional mouse, optical pointing devices have also been developed. In one form of an optical pointing device, rather than using a moving mechanical element like a ball in a conventional mouse, movement between an imaging surface, such as a finger or a desktop, and photo detectors within the optical pointing device, is optically sensed and converted into movement information.

The photo detectors in optical pointing devices are typically implemented in a flat, two-dimensional array. The array of photo detectors is capable of measuring absolute two-dimensional movement. As the array moves across an image, or the image moves across a stationary array, motion can be detected by comparing successive images. The sensed motion is in terms of the number of pixels that the image on the pixel array has moved. The array is typically at a fixed distance and a fixed angle from the surface being imaged, so the motion that is sensed is absolute (within the error tolerance of the system).

Existing optical sensors, such as those used in optical pointing devices, sense movement in an X and Y direction, but do not sense rotation. It would be desirable to provide a sensing apparatus using multiple two-dimensional photo detector arrays for sensing rotation of the apparatus.

SUMMARY OF THE INVENTION

One form of the present invention provides an apparatus for sensing rotation. The apparatus includes a plurality of motion sensors constructed in a substantially coplanar arrangement. The plurality of motion sensors is each configured to generate incremental movement data indicative of movement of the sensor in two dimensions. A rotation data generator generates rotation data based on the incremental movement data. The rotation data represents rotation of a first one of the motion sensors about a second one of the motion sensors.

BRIEF DESCRIPTION OF THE DRAWINGS

FIG. 3 is a diagram of a general rotation sensor orientation, three special rotation sensor orientations, and mirror rotation sensor orientations.

FIG. 14 is a diagram of an isosceles triangle representing rotation of a rotation sensor in the general orientation after translation has been eliminated.

FIG. 15A is a diagram illustrating rotation of a rotation sensor in the general orientation prior to a coordinate transformation.

FIG. 15B is a diagram illustrating rotation of a rotation sensor in the general orientation after a coordinate transformation.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Motion Sensing With a Single Optical Motion Sensor

Figure 1:
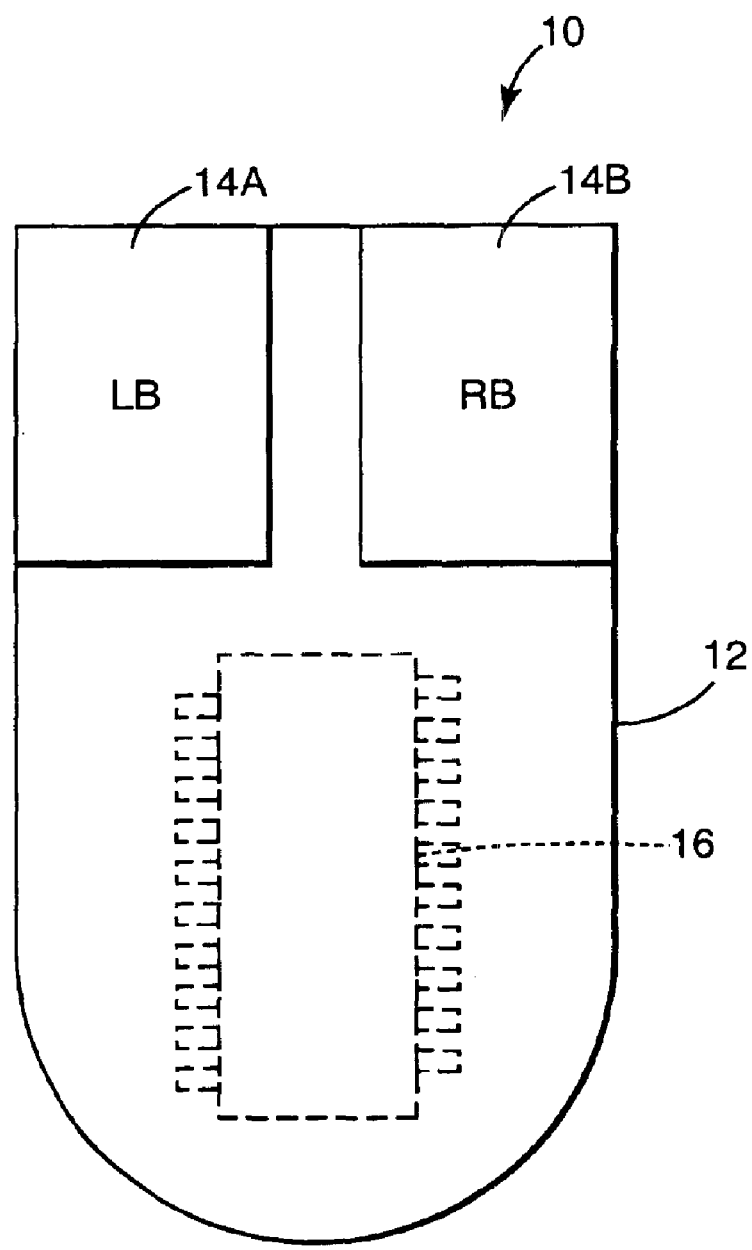
FIG. 1 is a top view of an optical mouse, which is suitable for incorporating one embodiment of the present invention.

FIG. 1 is a top view of an optical mouse 10, which is suitable for incorporating one embodiment of the present invention. Mouse 10 includes plastic case 12, left mouse button (LB) 14A, right mouse button (RB) 14B, and optical motion sensor chip 16. Sensor chip 16 is covered by plastic case 12, and is therefore shown with dashed lines in FIG. 1.

Figure 2:
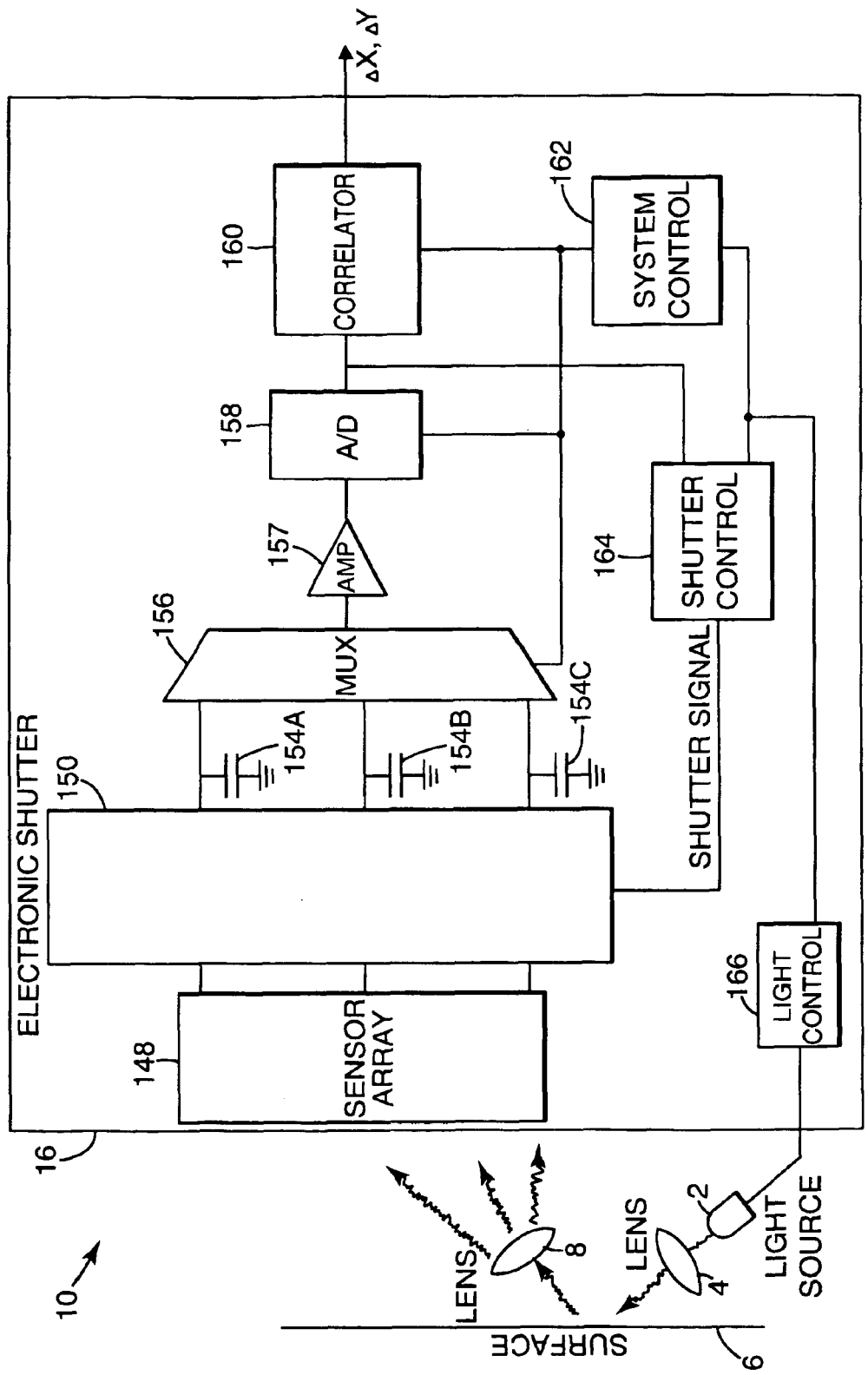
FIG. 2 is an electrical block diagram illustrating major components of the optical mouse shown in FIG. 1.

FIG. 2 is an electrical block diagram illustrating major components of optical mouse 10. Optical mouse 10 includes light source 2, lenses 4 and 8, and optical motion sensor 16. Optical motion sensor 16 includes photo detector array 148, electronic shutter 150, a plurality of sense capacitors 154A–154C (collectively referred to as sense capacitors 154), multiplexer 156, amplifier 157, analog to digital (A/D) converter 158, correlator 160, system controller 162, shutter controller 164, and light controller 166.

The operation of optical motion sensor 16 is primarily controlled by system controller 162, which is coupled to multiplexer 156, A/D converter 158, correlator 160, shutter controller 164, and light controller 166. In operation, according to one embodiment, light source 2 emits light that is projected by lens 4 onto surface 6, which is a desktop or other suitable imaging surface. Light source 2 is controlled by signals from light controller 166. Reflected light from surface 6 is directed by lens 8 onto photo detector array 148. Each photo detector in photo detector array 148 provides a current that varies in magnitude based upon the intensity of light incident on the photo detector.

Electronic shutter 150 is controlled by a shutter signal from shutter controller 164. When electronic shutter 150 is "open," charge accumulates on sense capacitors 154, creating a voltage that is related to the intensity of light incident on the photo detectors in array 148. When electronic shutter 150 is "closed," no further charge accumulates or is lost from sense capacitors 154. Multiplexer 156 connects each sense capacitor 154 in turn to amplifier 157 and A/D converter 158, to amplify and convert the voltage from each sense capacitor 154 to a digital value. Sense capacitors 154 are then discharged through electronic shutter 150 so that the charging process can be repeated.

Based on the level of voltage from sense capacitors 154, A/D converter 158 generates a digital value of a suitable resolution (e.g., one to eight bits) indicative of the level of voltage. The digital values for the photo detector array 148 represent a digital image or digital representation of the portion of the desktop or other imaging surface under optical mouse 10. The digital values are stored as a frame into corresponding locations within an array of memory within correlator 160.

The overall size of photo detector array 148 is preferably large enough to receive an image having several features. Images of such spatial features produce translated patterns of pixel information as optical mouse 10 moves over a surface. The number of photo detectors in array 148 and the frame rate at which their contents are captured and digitized cooperate to influence how fast optical mouse 10 can be moved across a surface and still be tracked. Tracking is accomplished by correlator 160 by comparing a newly captured sample frame with a previously captured reference frame to ascertain the direction and amount of movement. In one form of the invention, motion tracking is accomplished using techniques disclosed in the related patents identified above in the Reference to Related Patents section.

In one embodiment, the entire content of one of the frames is shifted by correlator 160 by a distance of one pixel successively in each of the eight-directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by correlator 160 on a pixel by pixel basis, and the resulting differences are preferably squared and then summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames. That is, it provides raw movement information that may be scaled and or accumulated to provide movement information ($\Delta X$ and $\Delta Y$) of a convenient granularity and at a suitable rate of information exchange.

In addition to providing digital images to correlator 160, A/D converter 158 also outputs digital image data to shutter controller 164. Shutter controller 164 helps to ensure that successive images have a similar exposure, and helps to prevent the digital values from becoming saturated to one value. Controller 164 checks the values of digital image data and determines whether there are too many minimum values or too many maximum values. If there are too many minimum values, controller 164 increases the charge accumulation time of electronic shutter 150. If there are too many maximum values, controller 164 decreases the charge accumulation time of electronic shutter 150.

II. Rotation Sensor Overview

As described above, optical mouse 10 uses a single optical motion sensor 16 for generating $\Delta X$ and $\Delta Y$ movement data. One embodiment of the present invention generates rotation data based on $\Delta X$ and $\Delta Y$ data generated by two optical motion sensors 16 (also referred to as optical motion sensors A and B, which are shown in FIG. 3). The two sensors A and B are collectively referred to as a rotation sensor.

The two sensors A and B are positioned at a known distance apart, and in a known orientation. There are a variety of possible orientations of the two sensors, as described below with reference to FIG. 3. The output from each sensor A and B is a $\Delta x$ and a $\Delta y$ count since the last position report. In one embodiment, sensors A and B measure position once a frame, which can occur at any defined interval. For current navigation sensors, the frame rate is typically 1500 to 2000 frames per second, either with the sensor reporting position once each frame, or via an I/O port, 100 to 200 times per second. In one embodiment, sensors A and B are operated at the same frame rate, and "re-reference" at the same time. The term "re-reference" refers to the storing of a new reference frame, which can occur when the sensor has moved from the original reference frame and the overlap between the current frame and the reference frame is decreasing. Re-referencing can also occur after times of no movement, so that the current reference frame is recent.

III. Rotation Sensor Orientation and Alignment

FIG. 3 is a diagram of a general rotation sensor orientation, three special rotation sensor orientations, and mirror rotation sensor orientations. The orientations shown in FIG. 3 are divided into four columns and four rows. The first row shows a general orientation (first column), a first special orientation (second column), a second special orientation (third column), and a third special orientation (fourth column). The second, third, and fourth rows show a horizontal mirror, a vertical mirror, and a combined horizontal and vertical mirror orientation, respectively, for each of the four orientations shown in the first row.

In each orientation, the two sensors (A and B) are placed a known distance, d, apart. In one embodiment, sensor A is at the origin coordinates (0,0), and sensor B is at different coordinates, which depend on the orientation and alignment of, and distance between, the two sensors. The following Table I provides coordinates for sensor B for the various orientations illustrated in FIG. 3, assuming a distance of "d" between sensors A and B.

designated by the letters A and B, and the position of the two sensors after being moved is designated by A' and B'.

Figure 4A:
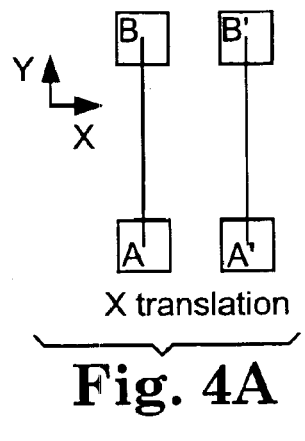
FIG. 4A is a diagram illustrating translation of a rotation sensor in the X direction.
Figure 4B:
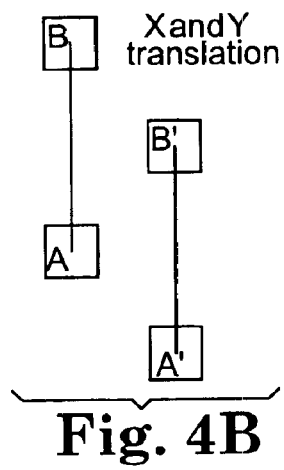
FIG. 4B is a diagram illustrating translation of a rotation sensor in the X and Y directions.
Figure 4C:
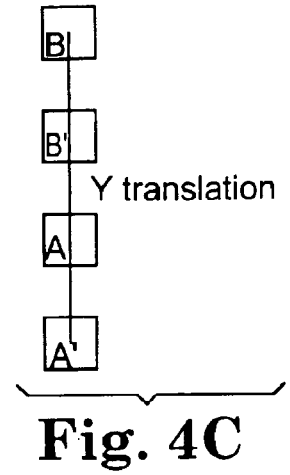
FIG. 4C is a diagram illustrating translation of a rotation sensor in the Y direction.
Figure 4D:
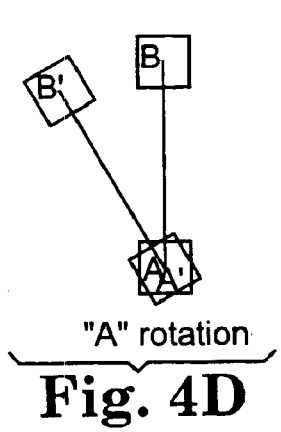
FIG. 4D is a diagram illustrating rotation of a rotation sensor.
Figure 4E:
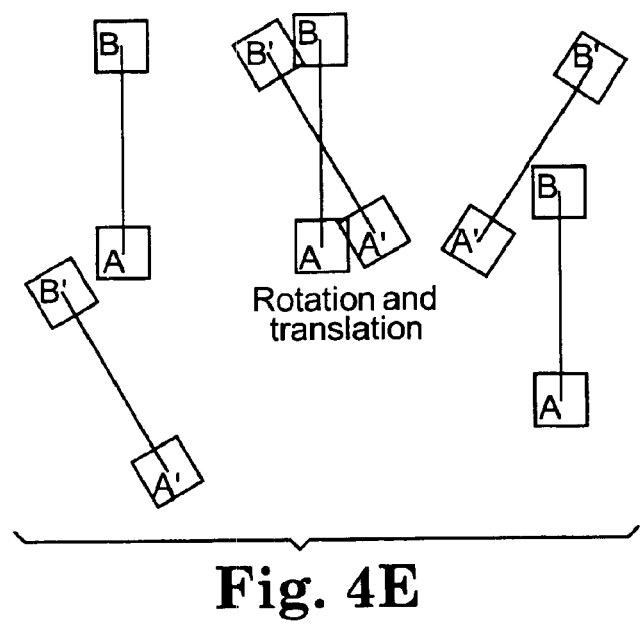
FIG. 4E is a diagram illustrating rotation and translation of a rotation sensor.

FIG. 4A is a diagram illustrating translation of sensors A and B in the positive X direction. FIG. 4B is a diagram illustrating translation of sensors A and B in the positive X and negative Y directions. FIG. 4C is a diagram illustrating translation of sensors A and B in the negative Y direction. FIG. 4D is a diagram illustrating rotation of sensors A and B about the center of sensor A. FIG. 4E is a diagram illustrating three different combinations of rotation and translation of sensors A and B.

Figure 5:
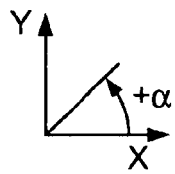
FIG. 5 is a diagram illustrating a positive angle of rotation on an X-Y axis.

FIG. 5 is a diagram illustrating a positive angle of rotation on an X-Y axis. As shown in FIG. 5, the angle of rotation ($\alpha$) is defined to be positive for counterclockwise rotations. The angle of rotation for clockwise rotations is negative. In an alternative embodiment, the angle of rotation could be defined as negative for counterclockwise rotations, and positive for clockwise rotations.

FIGS. 6A–13A and 16A–31A are diagrams illustrating various translations and rotations of sensors A and B in the various orientations and alignments shown in FIG. 3. Each of these Figures includes three columns and three rows of motion diagrams. The first column illustrates movements that include translations in the negative X direction. The

TABLE I

| | | Orientation | | |
|---|---|---|---|---|
| Alignment | General | #1 | #2 | #3 |
| Normal | $(-d\sin\theta_N, d\cos\theta_N)$ | (0, d) | (d, 0) | $(-d\sin 45, d\cos 45) = \left(\dfrac{-d}{\sqrt{2}}, \dfrac{d}{\sqrt{2}}\right)$ |
| Horizontal Mirror | $(-d\sin\theta_H, d\cos\theta_H)$ | (0, d) | | $(-d\sin 315, d\cos 315) = \left(\dfrac{d}{\sqrt{2}}, \dfrac{d}{\sqrt{2}}\right)$ |
| Vertical Mirror | $(-d\sin\theta_V, d\cos\theta_V)$ | (0, −d) | | $(-d\sin 135, d\cos 135) = \left(\dfrac{-d}{\sqrt{2}}, \dfrac{-d}{\sqrt{2}}\right)$ |
| Horizontal and Vertical Mirror | $(-d\sin\theta_{HV}, d\cos\theta_{HV})$ | | | $(-d\sin 225, d\cos 225) = \left(\dfrac{d}{\sqrt{2}}, \dfrac{d}{\sqrt{2}}\right)$ |

As shown in FIG. 3, the alignment angle for the general orientation in the normal alignment is $\theta_N$. For the general orientation, FIG. 3 also shows the horizontal mirror alignment angle ($\theta_H$), vertical mirror alignment angle ($\theta_V$), and horizontal and vertical mirror alignment angle ($\theta_{HV}$). These alignment angles are related to the normal alignment angle ($\theta_N$) by the relationships shown in the following Table II:

TABLE II

| Alignment | Angle | Equation |
|---|---|---|
| Horizontal Mirror | $\theta_H$ | $\theta_H = 360 - \theta_N$ |
| Vertical Mirror | $\theta_V$ | $\theta_V = 180 - \theta_N$ |
| Horizontal and Vertical Mirror | $\theta_{HV}$ | $\theta_{HV} = 180 + \theta_N$ |

IV. Motion of Rotation Sensor

As shown in FIGS. 4A–4E, motion of sensors A and B can include translation, rotation, or a combination of the two. It is assumed in the following description that rotation is around sensor A. Rotation about sensor B can be achieved via mirroring. The initial position of the two sensors is second column illustrates movements with no translation in the X direction. The third column illustrates movements that include translations in the positive X direction. The first row illustrates movements that include translations in the positive Y direction. The second row illustrates movements with no translation in the Y direction. The third row illustrates movements that include translations in the negative Y direction. Each of these Figures is described in further detail below.

A. General Orientation

Figure 6A:
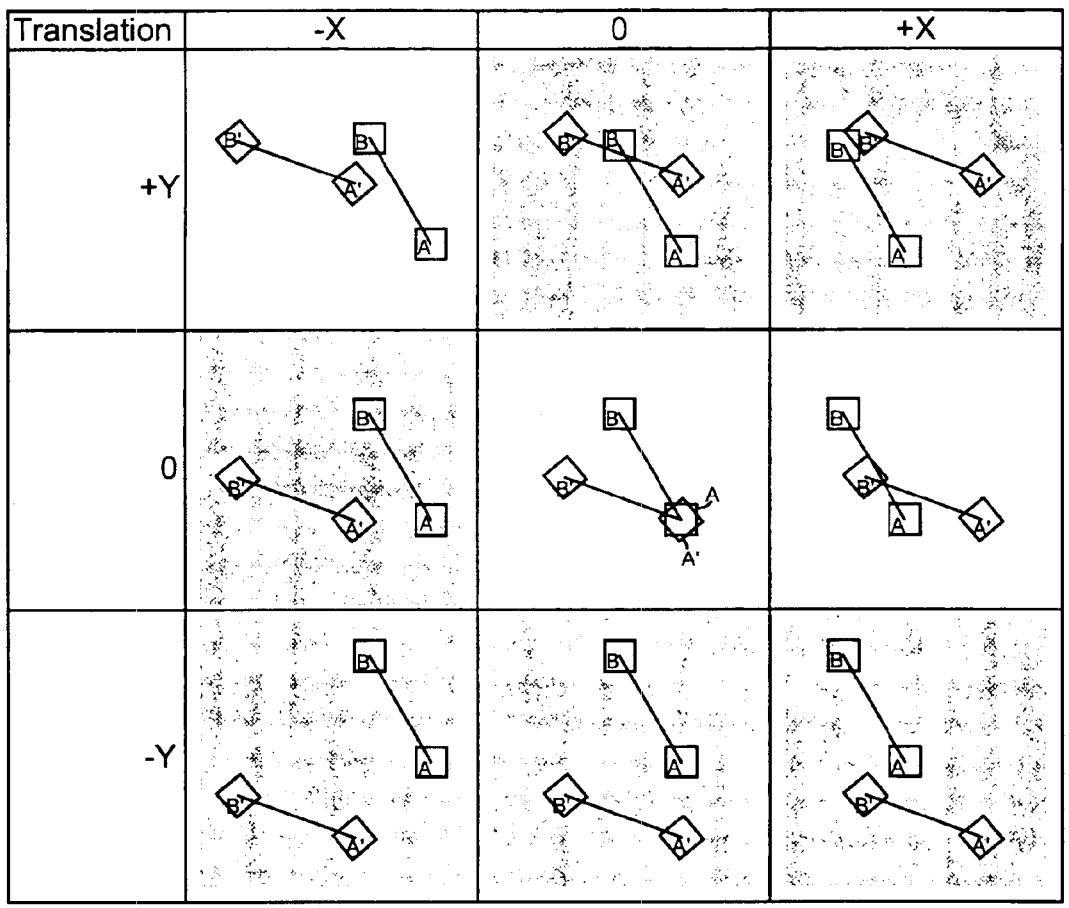
FIG. 6A is a diagram illustrating various translations and positive rotations of a rotation sensor in the general orientation.

FIG. 6A is a diagram illustrating various translations and positive rotations of sensors A and B in the general orientation. In the general orientation, sensors A and B are orientated so that the "x" and "y" motion reports from both sensors are in the same direction. Sensor B is located at a random angle from sensor A, but is at a known distance, d, from sensor A. When the normal alignment is mirrored, the orientations of sensor A and B are changed so that they are in the same direction as the normal alignment. In one embodiment, the X and Y motion reports are always reported in the same direction.

Figure 6B:
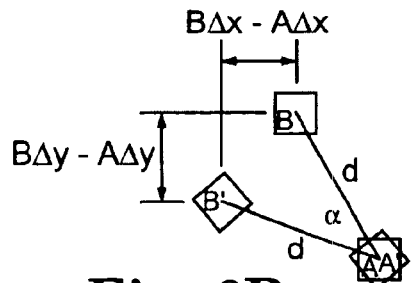
FIG. 6B is a diagram illustrating rotation of the rotation sensor after the translations shown in FIG. 6A have been eliminated.

FIG. 6B is a diagram illustrating rotation of the rotation sensor after the translations shown in FIG. 6A have been eliminated. The translations shown in FIG. 6A can be eliminated by subtracting the delta motion of sensor A (i.e., AΔx, AΔy) from the delta motion of sensor B (i.e., BΔx, BΔy). FIG. 6B also shows the distance, d, between sensors A and B, along with the angle of rotation, α.

Figure 7A:
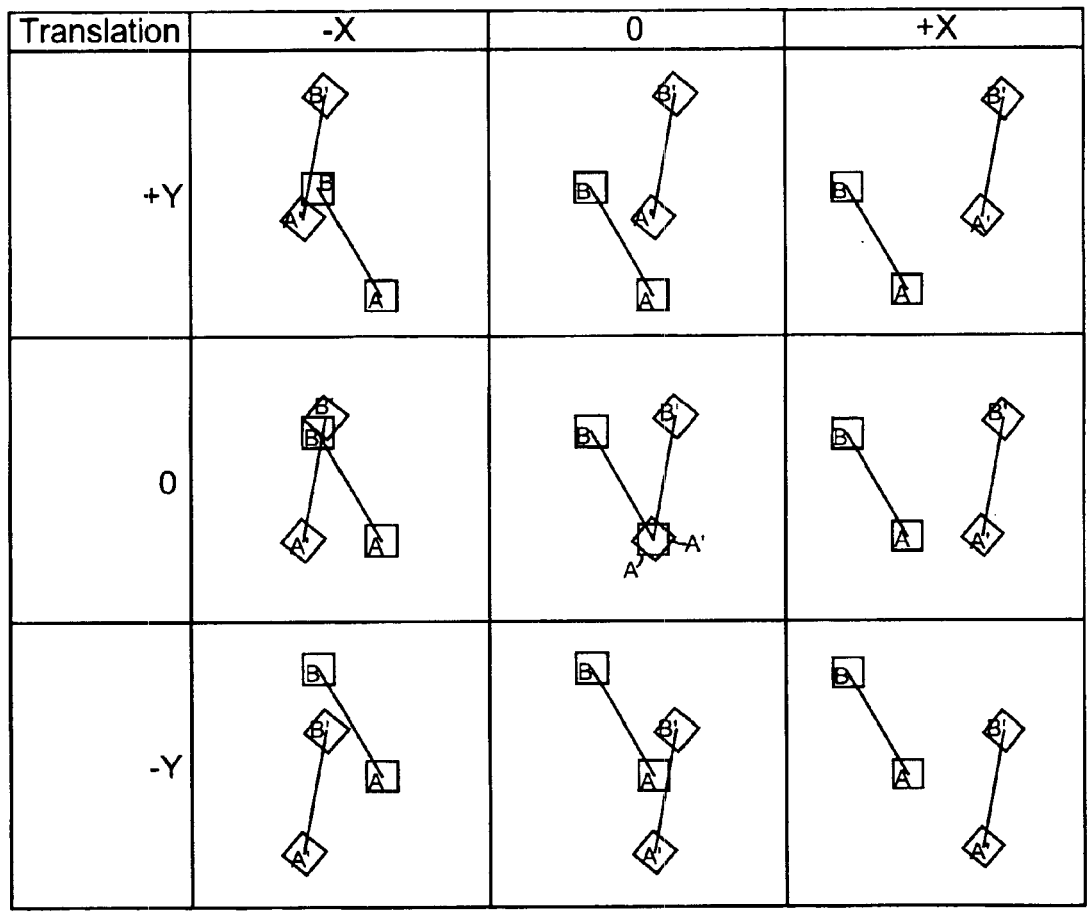
FIG. 7A is a diagram illustrating various translations and negative rotations of a rotation sensor in the general orientation.
Figure 7B:
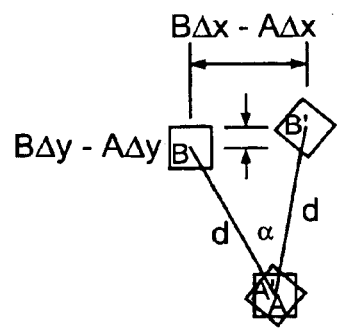
FIG. 7B is a diagram illustrating rotation of the rotation sensor after the translations shown in FIG. 7A have been eliminated.

FIG. 7A is a diagram illustrating various translations and negative rotations of sensors A and B in the general orientation. FIG. 7B is a diagram illustrating rotation of the rotation sensor after the translations shown in FIG. 7A have been eliminated. The translations shown in FIG. 7A can be eliminated by subtracting the delta motion of sensor A (i.e., AΔx, AΔy) from the delta motion of sensor B (i.e., BΔx, BΔy). FIG. 7B also shows the distance, d, between sensors A and B, along with the angle of rotation, α.

Figures 8A, 8B:
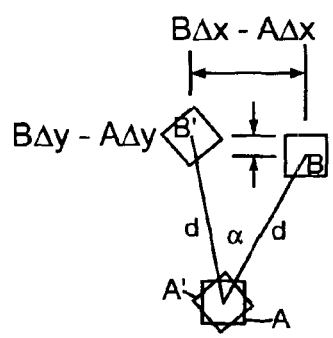
FIG. 8A is a diagram illustrating various translations and positive rotations of a rotation sensor in a horizontal mirror of the general orientation.
FIG. 8B is a diagram illustrating rotation of the rotation sensor after the translations shown in FIG. 8A have been eliminated.

FIG. 8A is a diagram illustrating various translations and positive rotations of sensors A and B in a horizontal mirror of the general orientation. FIG. 8B is a diagram illustrating rotation of the rotation sensor after the translations shown in FIG. 8A have been eliminated. The translations shown in FIG. 8A can be eliminated by subtracting the delta motion of sensor A (i.e., AΔx, AΔy) from the delta motion of sensor B (i.e., BΔx, BΔy). FIG. 8B also shows the distance, d, between sensors A and B, along with the angle of rotation, α.

Figure 9A:
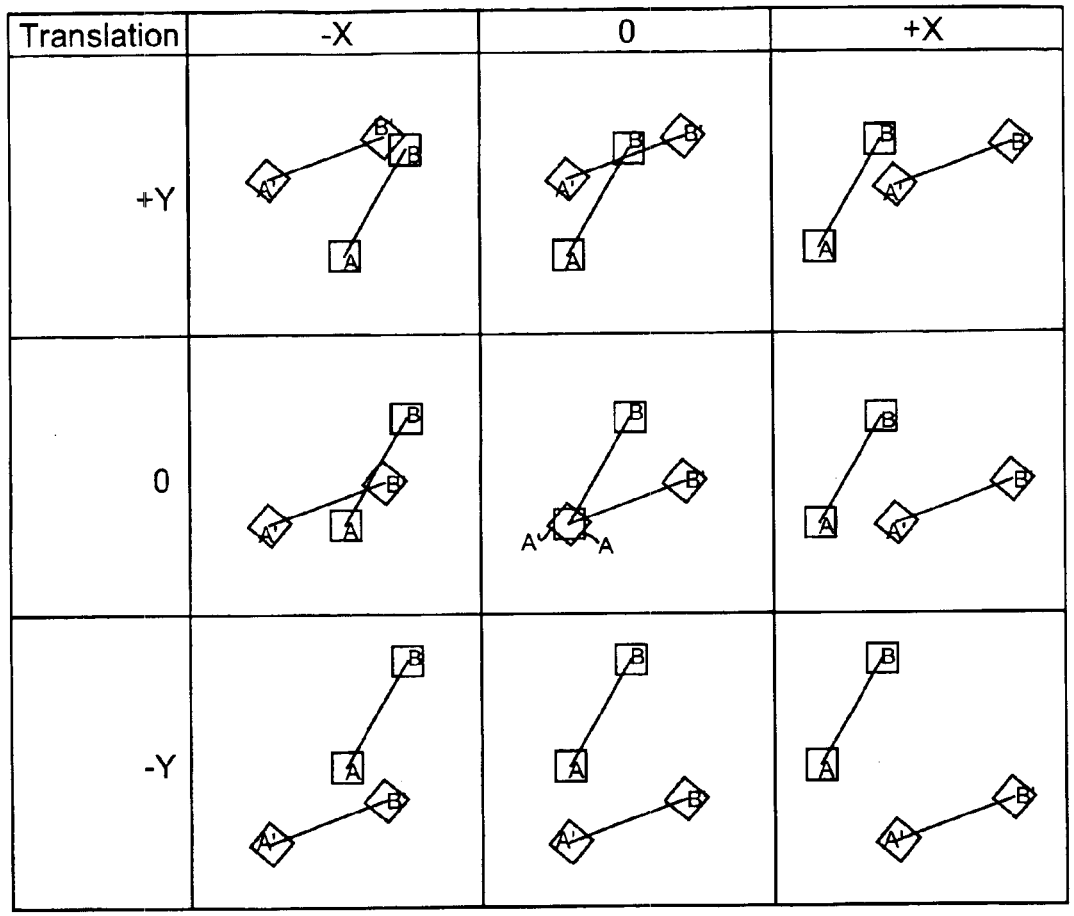
FIG. 9A is a diagram illustrating various translations and negative rotations of a rotation sensor in a horizontal mirror of the general orientation.
Figure 9B:
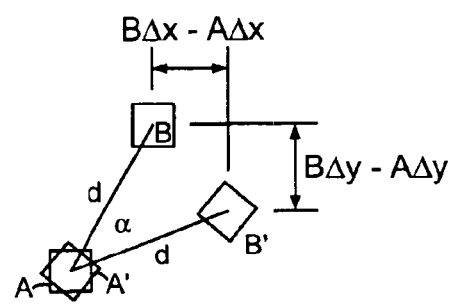
FIG. 9B is a diagram illustrating rotation of the rotation sensor after the translations shown in FIG. 9A have been eliminated.

FIG. 9A is a diagram illustrating various translations and negative rotations of sensors A and B in a horizontal mirror of the general orientation. FIG. 9B is a diagram illustrating rotation of the rotation sensor after the translations shown in FIG. 9A have been eliminated. The translations shown in FIG. 9A can be eliminated by subtracting the delta motion of sensor A (i.e., AΔx, AΔy) from the delta motion of sensor B (i.e., BΔx, BΔy). FIG. 9B also shows the distance, d, between sensors A and B, along with the angle of rotation, α.

Figure 10A:
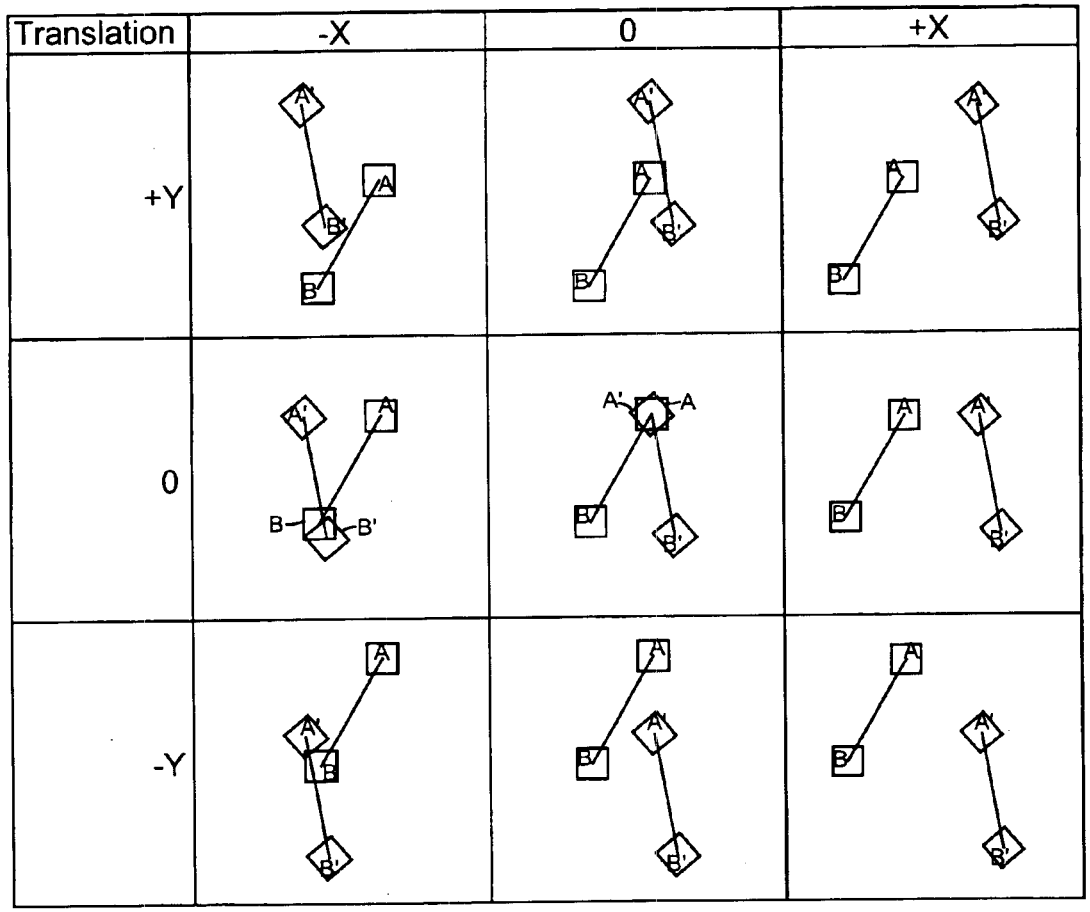
FIG. 10A is a diagram illustrating various translations and positive rotations of a rotation sensor in a vertical mirror of the general orientation.
Figure 10B:
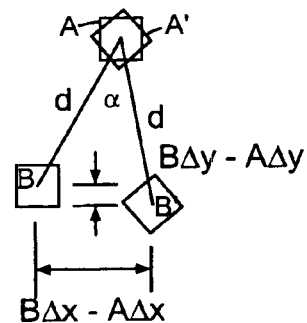
FIG. 10B is a diagram illustrating rotation of the rotation sensor after the translations shown in FIG. 10A have been eliminated.

FIG. 10A is a diagram illustrating various translations and positive rotations of sensors A and B in a vertical mirror of the general orientation. FIG. 10B is a diagram illustrating rotation of the rotation sensor after the translations shown in FIG. 10A have been eliminated. The translations shown in FIG. 10A can be eliminated by subtracting the delta motion of sensor A (i.e., AΔx, AΔy) from the delta motion of sensor B (i.e., BΔx, BΔy). FIG. 10B also shows the distance, d, between sensors A and B, along with the angle of rotation, α.

Figure 11A:
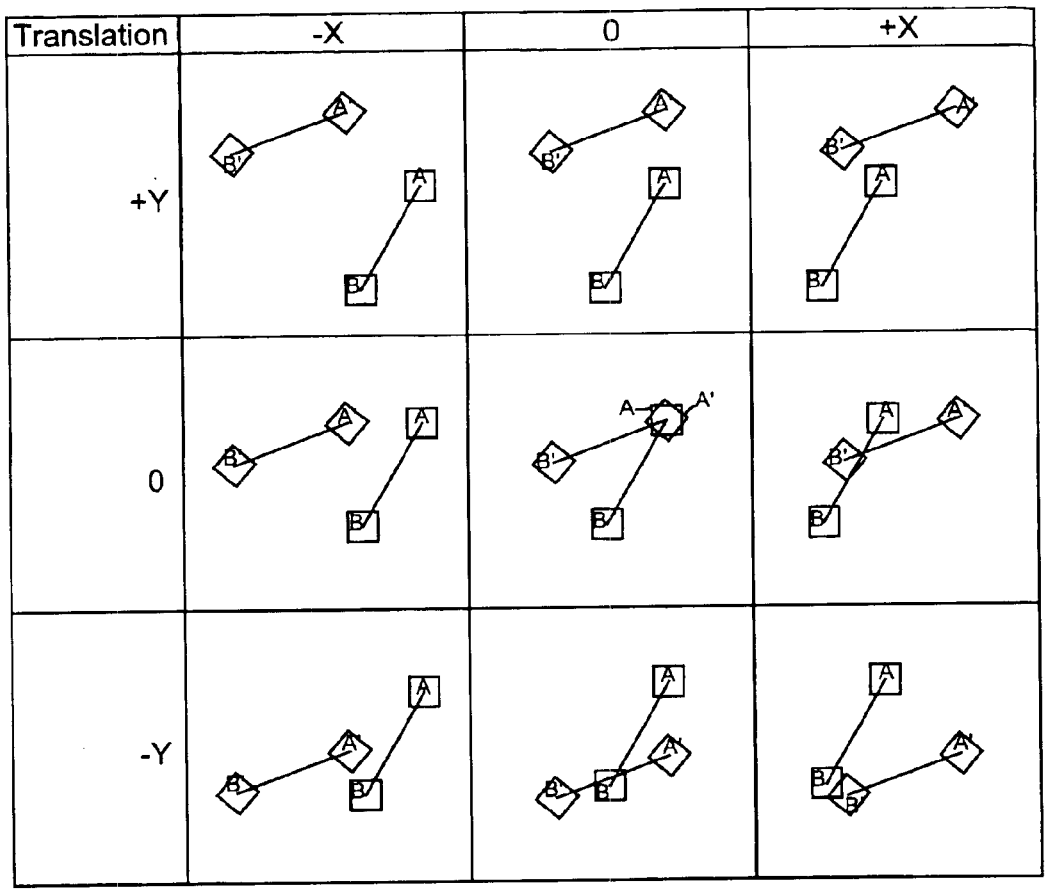
FIG. 11A is a diagram illustrating various translations and negative rotations of a rotation sensor in a vertical mirror of the general orientation.
Figure 11B:
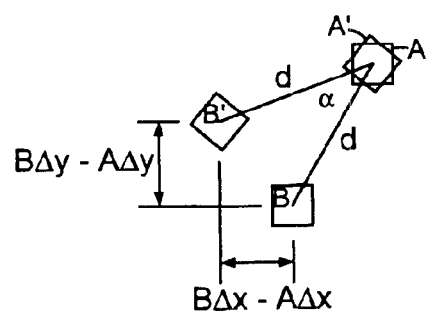
FIG. 11B is a diagram illustrating rotation of the rotation sensor after the translations shown in FIG. 11A have been eliminated.

FIG. 11A is a diagram illustrating various translations and negative rotations of sensors A and B in a vertical mirror of the general orientation. FIG. 11B is a diagram illustrating rotation of the rotation sensor after the translations shown in FIG. 11A have been eliminated. The translations shown in FIG. 11A can be eliminated by subtracting the delta motion of sensor A (i.e., AΔx, AΔy) from the delta motion of sensor B (i.e., BΔx, BΔy). FIG. 11B also shows the distance, d, between sensors A and B, along with the angle of rotation, α.

Figure 12A:
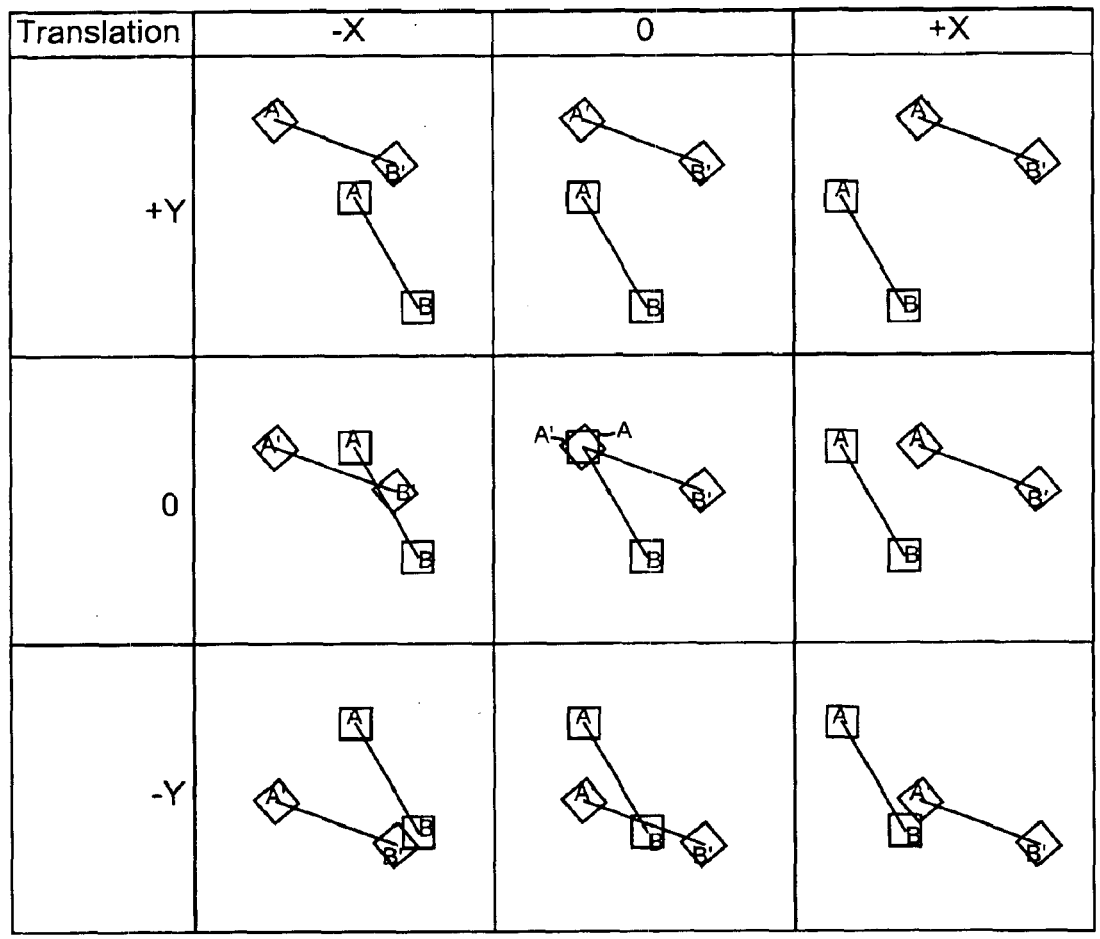
FIG. 12A is a diagram illustrating various translations and positive rotations of a rotation sensor in a horizontal and vertical mirror of the general orientation.
Figure 12B:
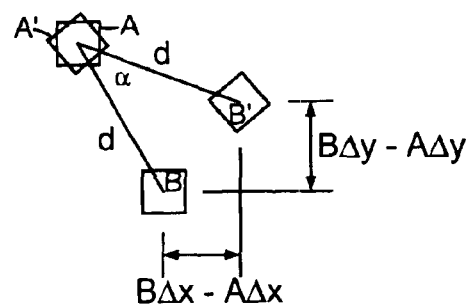
FIG. 12B is a diagram illustrating rotation of the rotation sensor after the translations shown in FIG. 12A have been eliminated.

FIG. 12A is a diagram illustrating various translations and positive rotations of sensors A and B in a horizontal and vertical mirror of the general orientation. FIG. 12B is a diagram illustrating rotation of the rotation sensor after the translations shown in FIG. 12A have been eliminated. The translations shown in FIG. 12A can be eliminated by subtracting the delta motion of sensor A (i.e., AΔx, AΔy) from the delta motion of sensor B (i.e., BΔx, BΔy). FIG. 12B also shows the distance, d, between sensors A and B, along with the angle of rotation, α.

Figure 13A:
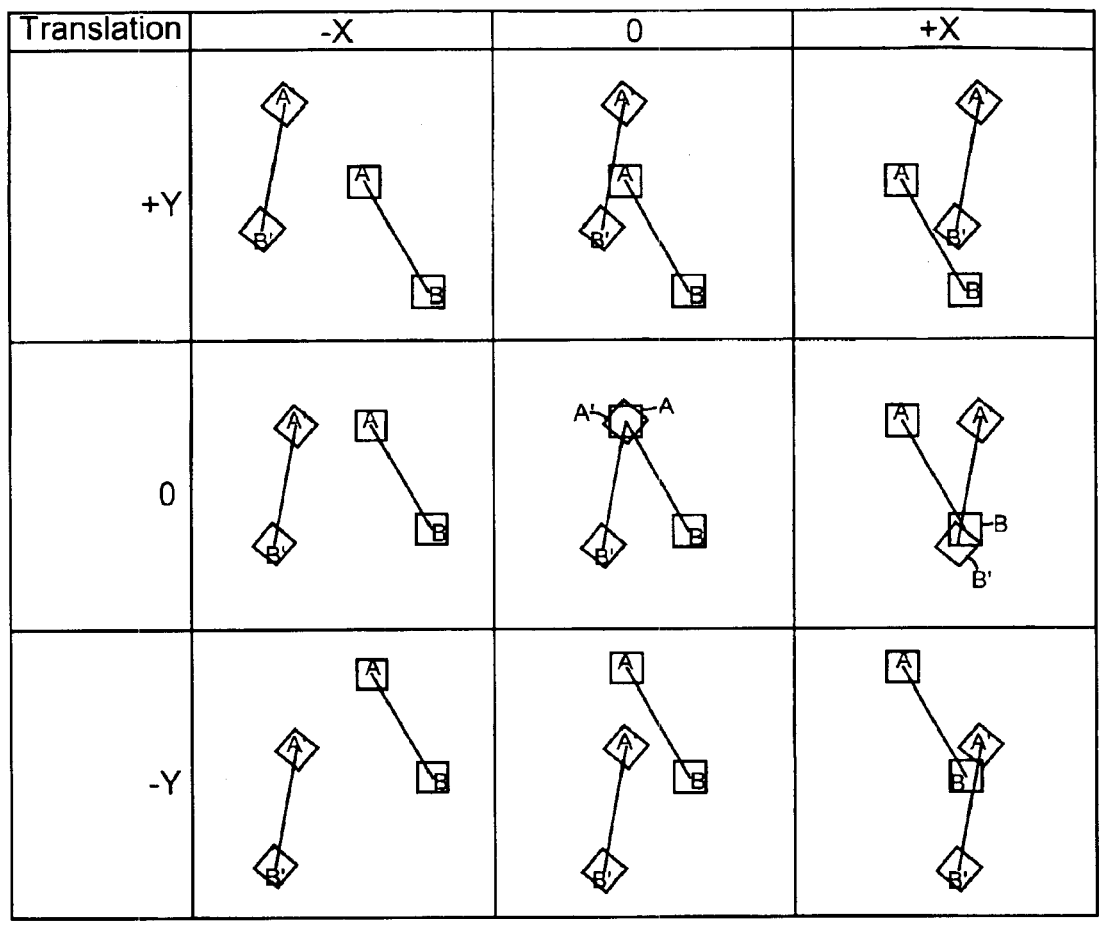
FIG. 13A is a diagram illustrating various translations and positive rotations of a rotation sensor in a horizontal and vertical mirror of the general orientation.
Figure 13B:
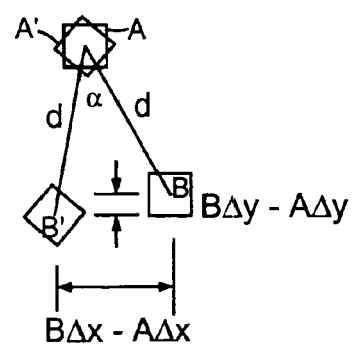
FIG. 13B is a diagram illustrating rotation of the rotation sensor after the translations shown in FIG. 13A have been eliminated.

FIG. 13A is a diagram illustrating various translations and positive rotations of sensors A and B in a horizontal and vertical mirror of the general orientation. FIG. 13B is a diagram illustrating rotation of the rotation sensor after the translations shown in FIG. 13A have been eliminated. The translations shown in FIG. 13A can be eliminated by subtracting the delta motion of sensor A (i.e., AΔx, AΔy) from the delta motion of sensor B (i.e., BΔx, BΔy). FIG. 13B also shows the distance, d, between sensors A and B, along with the angle of rotation, α.

1. Determining the Angle of Rotation

For the general orientation, after the translation of sensor A is subtracted out, the resulting figure is an isosceles triangle. FIG. 14 is a diagram of an isosceles triangle representing rotation of sensors A and B in the general orientation after translation has been eliminated. As shown in FIG. 14, two of the sides are length "d", the third side has a length of $[(B\Delta x - A\Delta x)^2 + (B\Delta y - A\Delta y)^2]^{(1/2)}$, and the angle of rotation is represented by α.

A formula for a general triangle that relates the sides to the angle α is provided in the following Equation I:

$$\cos\alpha = \frac{(b^2 + c^2 - a^2)}{2bc} \qquad \text{Equation I}$$

In this case:

b=d;

c=d; and $a = \sqrt{(B\Delta x - A\Delta x)^2 + (B\Delta y - A\Delta y)^2}$

Inserting these values for a, b, and c into Equation I, and solving for the angle of rotation, α, results in the following Equation II:

$$\alpha = \cos^{-1}\frac{2d^2 - (B\Delta x - A\Delta x)^2 - (B\Delta y - A\Delta y)^2}{2d^2} \qquad \text{Equation II}$$

Equation II always results in a positive value for the angle of rotation. To identify the direction of rotation, the sign of α is determined as described below.

2. Determining the Sign of α

To determine the sign of α, the general orientation undergoes a coordinate transformation to rotate the initial position back to the Y-axis, which allows an easy determination of the sign of the rotation. FIG. 15A is a diagram illustrating rotation of sensors A and B in the general orientation prior to a coordinate transformation. The initial position of sensor B is (−d sin θ, d cos θ), and the position of sensor B after sensor rotation is (−d sin θ+Δx, d cos θ+Δy), where Δx is (BΔx−AΔx) and Δy is (BΔy−AΔy).

FIG. 15B is a diagram illustrating rotation of sensors A and B in the general orientation after a −θ coordinate transformation. The formula for the coordinate transformation is given in the following Equation III:

$$(x', y') = \begin{bmatrix} \cos\alpha & -\sin\alpha \\ \sin\alpha & \cos\alpha \end{bmatrix}(x, y) \qquad \text{Equation III}$$

where:

(x, y) is the position of sensor B after rotation and before the coordinate transformation; and (x', y') is the position of sensor B after rotation and after the coordinate transformation.

After performing the matrix multiplication in Equation III, the following Equations IV and V are obtained:

$$x' = x\cos\alpha - y\sin\alpha \qquad \text{Equation IV}$$

$$y' = x\sin\alpha + y\cos\alpha \qquad \text{Equation V}$$

Substituting α=−θ into Equations IV and V results in the following Equations VI and VII:

$$x'=x \cos(-\theta)-y \sin(-\theta) \quad \text{Equation VI}$$

$$y'=x \sin(-\theta)+y \cos(-\theta) \quad \text{Equation VII}$$

Substituting cos(−θ)=cos θ and sin(−θ)=−sin θ into Equations VI and VII results in the following Equations VIII and IX:

$$x'=x \cos\theta+y \sin\theta \quad \text{Equation VIII}$$

$$y'=-x \sin\theta+y \cos\theta \quad \text{Equation IX}$$

Substituting x=(−d sin θ+Δx) and y=(d cos θ+Δy) into Equations VIII and IX results in the following Equations X and XI:

$$x'=(-d \sin\theta+\Delta x) \cos\theta+(d \cos\theta+\Delta y)\sin\theta \quad \text{Equation X}$$

$$y'=-(-d \sin\theta+\Delta x)\sin\theta+(d \cos\theta+\Delta y)\cos\theta \quad \text{Equation XI}$$

Rearranging terms in Equations X and XI results in the following Equations XII and XIII:

$$x'=\Delta x \cos\theta - d \sin\theta \cos\theta + d \sin\theta \cos\theta + \Delta y \sin\theta \quad \text{Equation XII}$$

$$y'=d \sin^2\theta - \Delta x \sin\theta + d \cos^2\theta + \Delta y \cos\theta \quad \text{Equation XIII}$$

Combining terms in Equations XII and XIII results in the following Equations XIV and XV:

$$x'=\Delta x \cos\theta+\Delta y \sin\theta \quad \text{Equation XIV}$$

$$y'=d(\sin^2\theta+\cos^2\theta)-\Delta x \sin\theta+\Delta y \cos\theta \quad \text{Equation XV}$$

Applying the Pythagorean identity, $\sin^2\theta+\cos^2\theta=1$, to Equation XV, results in the following Equation XVI:

$$y'=d-\Delta x \sin\theta+\Delta y \cos\theta \quad \text{Equation XVI}$$

After solving Equation XIV for x' using the appropriate θ from Table II above, the sign of α is determined, which is the inverse of the sign of x'. In an alternative embodiment, y' from Equation XVI could be used to determine the sign of α.

B. First Special Orientation

Figure 16A:
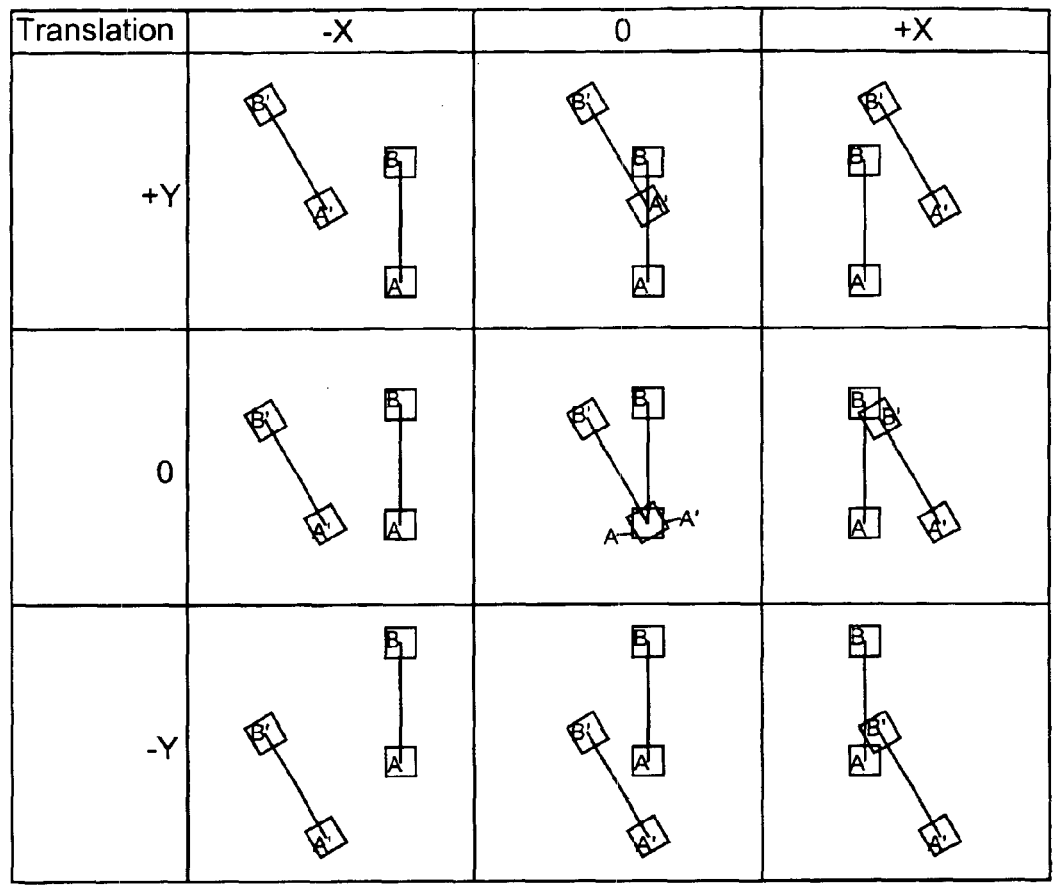
FIG. 16A is a diagram illustrating various translations and positive rotations of a rotation sensor in a first special orientation.

FIG. 16A is a diagram illustrating various translations and positive rotations of sensors A and B in the first special orientation. In the first special orientation, sensors A and B are orientated so that the "x" and "y" motion reports from both sensors are in the same direction. Sensor B is located above sensor A at a Y distance of "d". Since horizontal mirroring has no effect on the first special orientation, only the vertical mirror will be discussed. The first special orientation in the normal alignment is the same as the general orientation in the normal alignment with an alignment angle, $\theta_N$, equal to zero degrees.

Figure 16B:
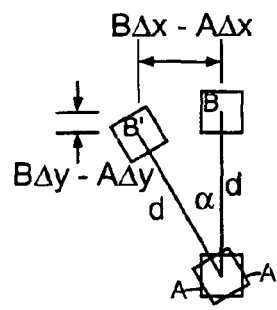
FIG. 16B is a diagram illustrating rotation of the rotation sensor after the translations shown in FIG. 16A have been eliminated.

FIG. 16B is a diagram illustrating rotation of the rotation sensor after the translations shown in FIG. 16A have been eliminated. The translations shown in FIG. 16A can be eliminated by subtracting the delta motion of sensor A (i.e., AΔx, AΔy) from the delta motion of sensor B (i.e., BΔx, BΔy). FIG. 16B also shows the distance, d, between sensors A and B, along with the angle of rotation, α.

Figure 17A:
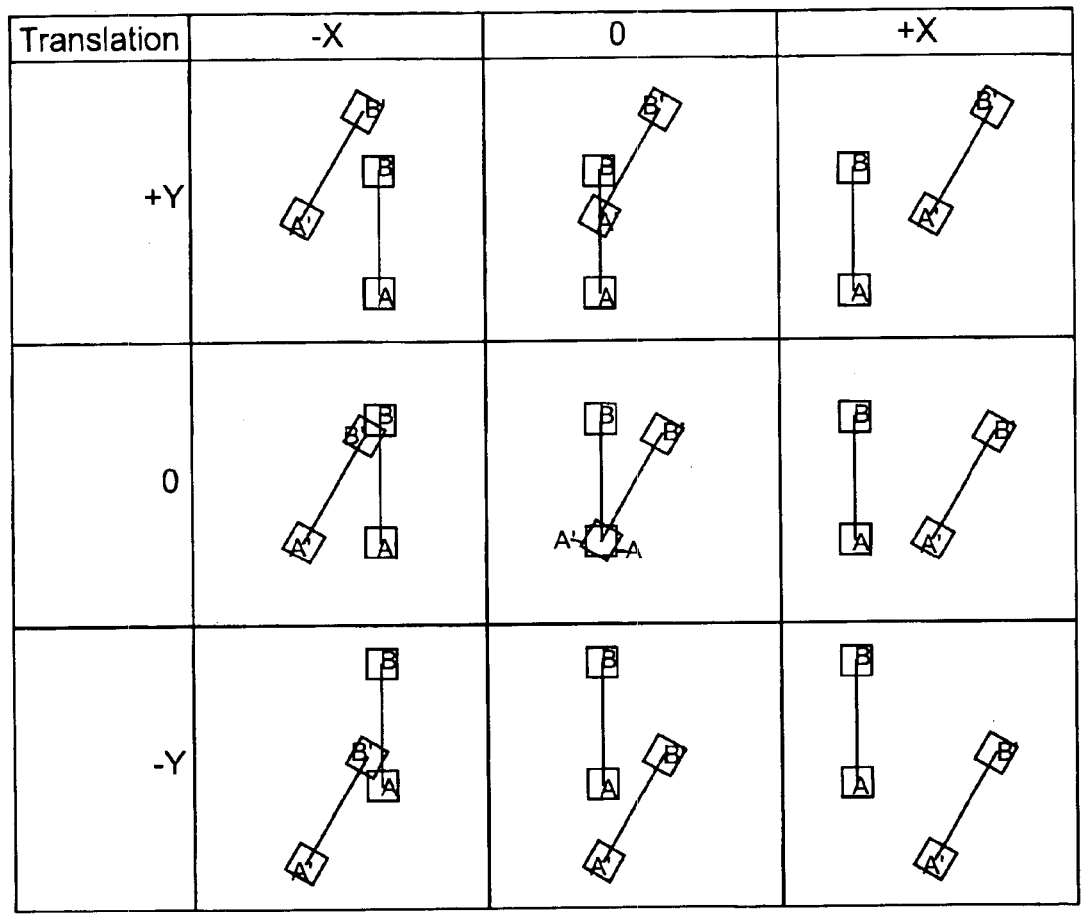
FIG. 17A is a diagram illustrating various translations and negative rotations of a rotation sensor in a first special orientation.
Figure 17B:
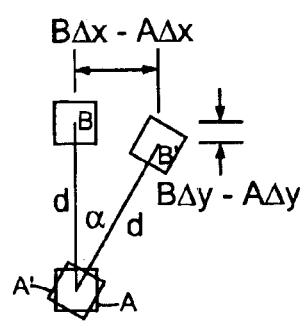
FIG. 17B is a diagram illustrating rotation of the rotation sensor after the translations shown in FIG. 17A have been eliminated.

FIG. 17A is a diagram illustrating various translations and negative rotations of sensors A and B in the first special orientation. FIG. 17B is a diagram illustrating rotation of the rotation sensor after the translations shown in FIG. 17A have been eliminated. The translations shown in FIG. 17A can be eliminated by subtracting the delta motion of sensor A (i.e., AΔx, AΔy) from the delta motion of sensor B (i.e., BΔx, BΔy). FIG. 17B also shows the distance, d, between sensors A and B, along with the angle of rotation, α.

Figures 18A, 18B:
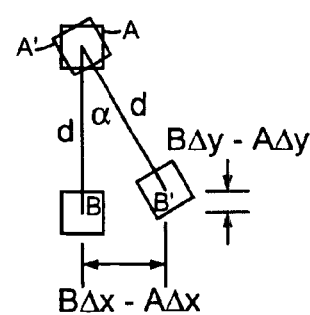
FIG. 18A is a diagram illustrating various translations and positive rotations of a rotation sensor in a vertical mirror of the first special orientation.
FIG. 18B is a diagram illustrating rotation of the rotation sensor after the translations shown in FIG. 18A have been eliminated.

FIG. 18A is a diagram illustrating various translations and positive rotations of sensors A and B in a vertical mirror of the first special orientation. The first special orientation in the vertical mirror alignment is the same as the general orientation in the normal alignment with an alignment angle, $\theta_N$, equal to 180 degrees. FIG. 18B is a diagram illustrating rotation of the rotation sensor after the translations shown in FIG. 18A have been eliminated. The translations shown in FIG. 18A can be eliminated by subtracting the delta motion of sensor A (i.e., AΔx, AΔy) from the delta motion of sensor B (i.e., BΔx, BΔy). FIG. 18B also shows the distance, d, between sensors A and B, along with the angle of rotation, α.

Figure 19A:
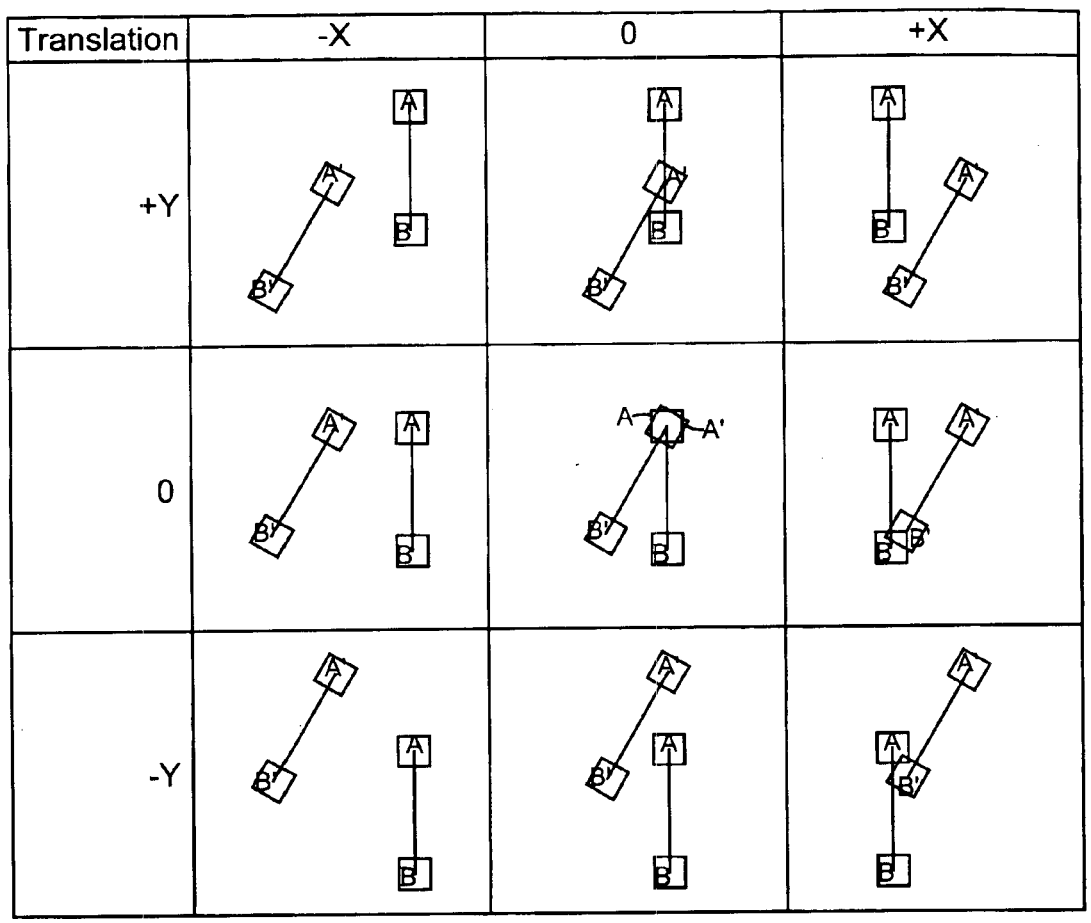
FIG. 19A is a diagram illustrating various translations and negative rotations of a rotation sensor in a vertical mirror of the first special orientation.
Figure 19B:
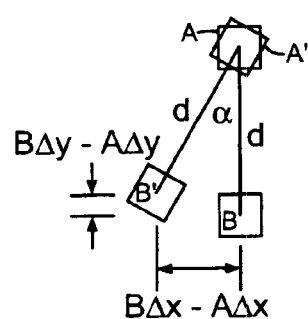
FIG. 19B is a diagram illustrating rotation of the rotation sensor after the translations shown in FIG. 19A have been eliminated.

FIG. 19A is a diagram illustrating various translations and negative rotations of sensors A and B in a vertical mirror of the first special orientation. FIG. 19B is a diagram illustrating rotation of the rotation sensor after the translations shown in FIG. 19A have been eliminated. The translations shown in FIG. 19A can be eliminated by subtracting the delta motion of sensor A (i.e., AΔx, AΔy) from the delta motion of sensor B (i.e., BΔx, BΔy). FIG. 19B also shows the distance, d, between sensors A and B, along with the angle of rotation, α.

1. Determining the Angle of Rotation

Since the starting axis between sensor A and sensor B is vertical in the first special orientation, the general formula given in Equation II for the angle of rotation, α, can be simplified. The distance (BΔx−AΔx) is perpendicular to the axis between sensors A and B. Since the distance between A and B is known to be d, the angle α is determined from the following Equation XVII:

$$\alpha = \sin^{-1}\left(\frac{B\Delta x - A\Delta x}{d}\right) \quad \text{Equation XVII}$$

The general formula given in Equation II can also be used to determine the angle of rotation for the first special orientation.

2. Determining the Sign of α

The appropriate sign of α can be determined for the first special orientation in either the normal or vertical mirror alignment from the following Table III:

TABLE III

| Alignment | Sign of α |
| --- | --- |
| Normal | inverse sign of (BΔx − AΔx) |
| Vertical Mirror | sign of (BΔx − AΔx) |

C. Second Special Orientation

Figure 20A:
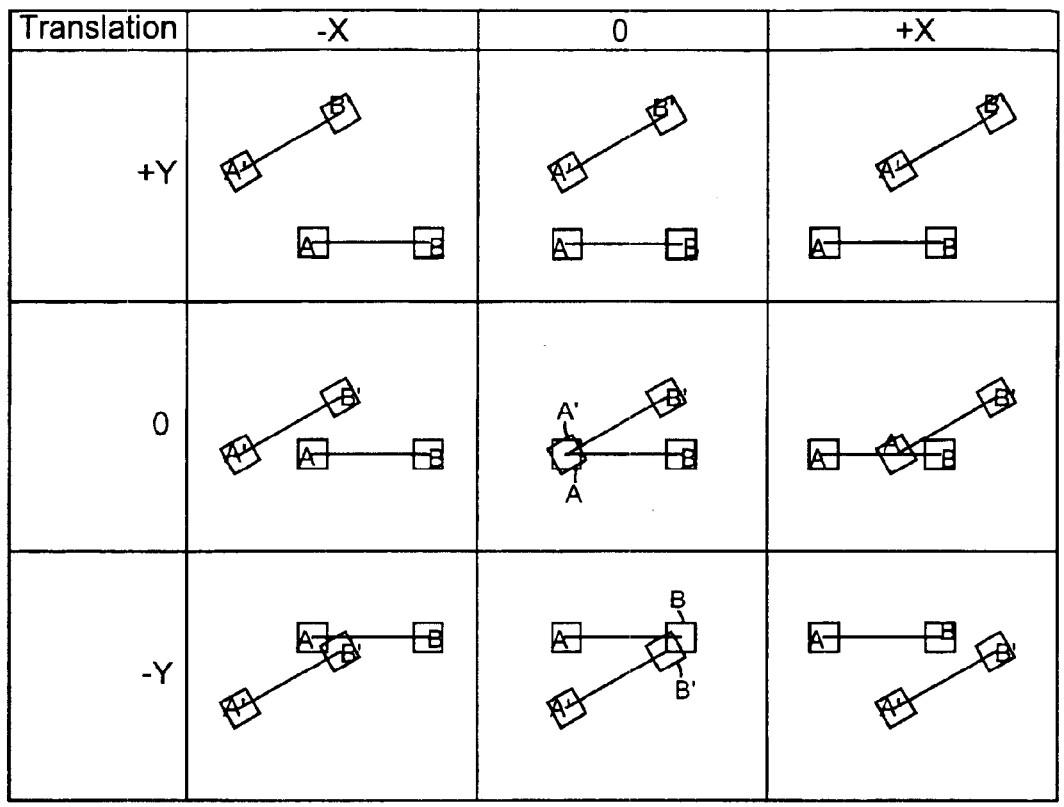
FIG. 20A is a diagram illustrating various translations and positive rotations of a rotation sensor in a second special orientation.

FIG. 20A is a diagram illustrating various translations and positive rotations of sensors A and B in the second special orientation. In the second special orientation, sensors A and B are orientated so that the "x" and "y" motion reports from both sensors are in the same direction. Sensor B is located to the right of sensor A at an X distance of "d". Since vertical mirroring has no effect on the second special orientation, only the horizontal mirror will be discussed. The second special orientation in the normal alignment is the same as the general orientation in the normal alignment with an alignment angle, $\theta_N$, equal to 270 degrees.

Figure 20B:
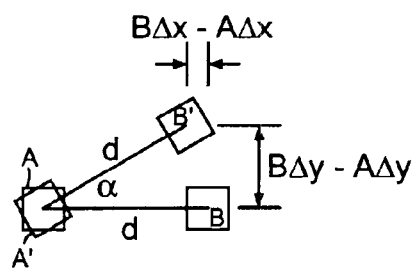
FIG. 20B is a diagram illustrating rotation of the rotation sensor after the translations shown in FIG. 20A have been eliminated.

FIG. 20B is a diagram illustrating rotation of the rotation sensor after the translations shown in FIG. 20A have been eliminated. The translations shown in FIG. 20A can be eliminated by subtracting the delta motion of sensor A (i.e., A$\Delta$x, A$\Delta$y) from the delta motion of sensor B (i.e., B$\Delta$x, B$\Delta$y). FIG. 20B also shows the distance, d, between sensors A and B, along with the angle of rotation, $\alpha$.

Figure 21A:
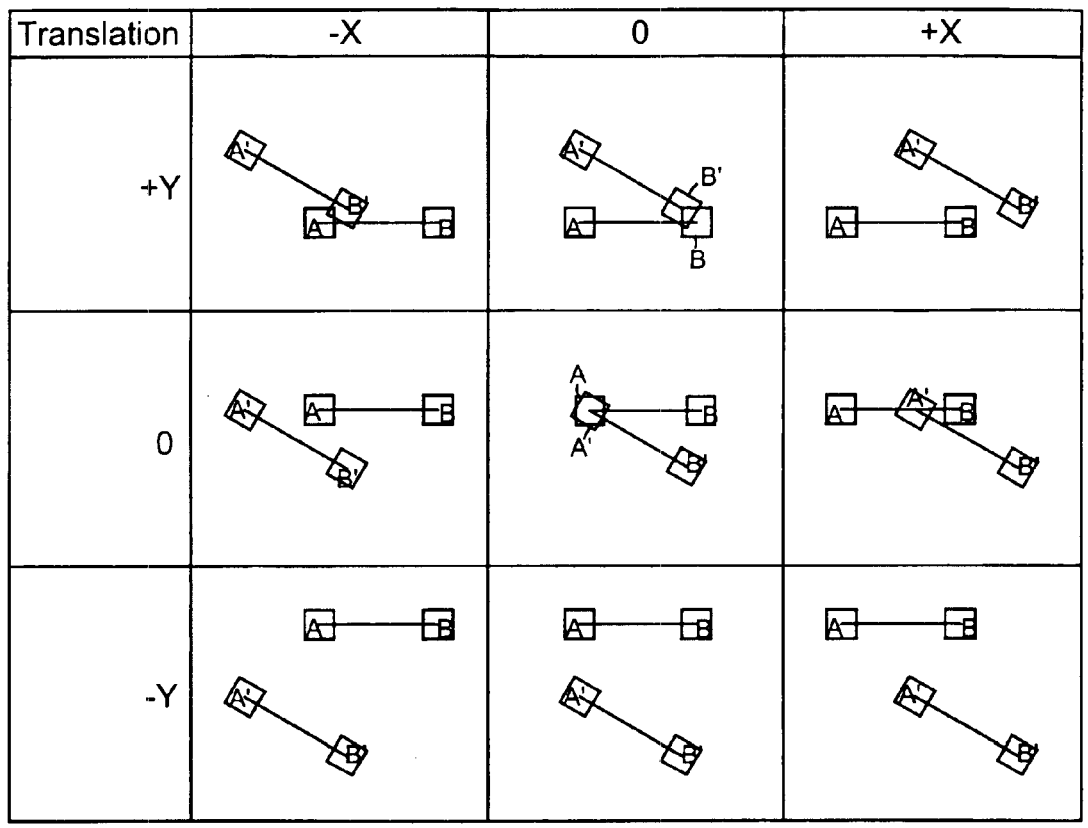
FIG. 21A is a diagram illustrating various translations and negative rotations of a rotation sensor in a second special orientation.
Figure 21B:
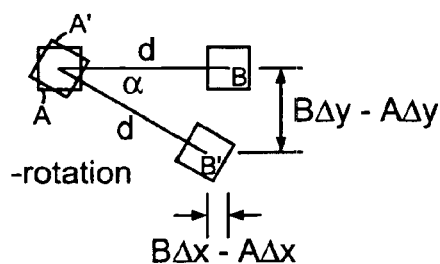
FIG. 21B is a diagram illustrating rotation of the rotation sensor after the translations shown in FIG. 21A have been eliminated.

FIG. 21A is a diagram illustrating various translations and negative rotations of sensors A and B in the second special orientation. FIG. 21B is a diagram illustrating rotation of the rotation sensor after the translations shown in FIG. 21A have been eliminated. The translations shown in FIG. 21A can be eliminated by subtracting the delta motion of sensor A (i.e., A$\Delta$x, A$\Delta$y) from the delta motion of sensor B (i.e., B$\Delta$x, B$\Delta$y). FIG. 21B also shows the distance, d, between sensors A and B, along with the angle of rotation, $\alpha$.

Figure 22A:
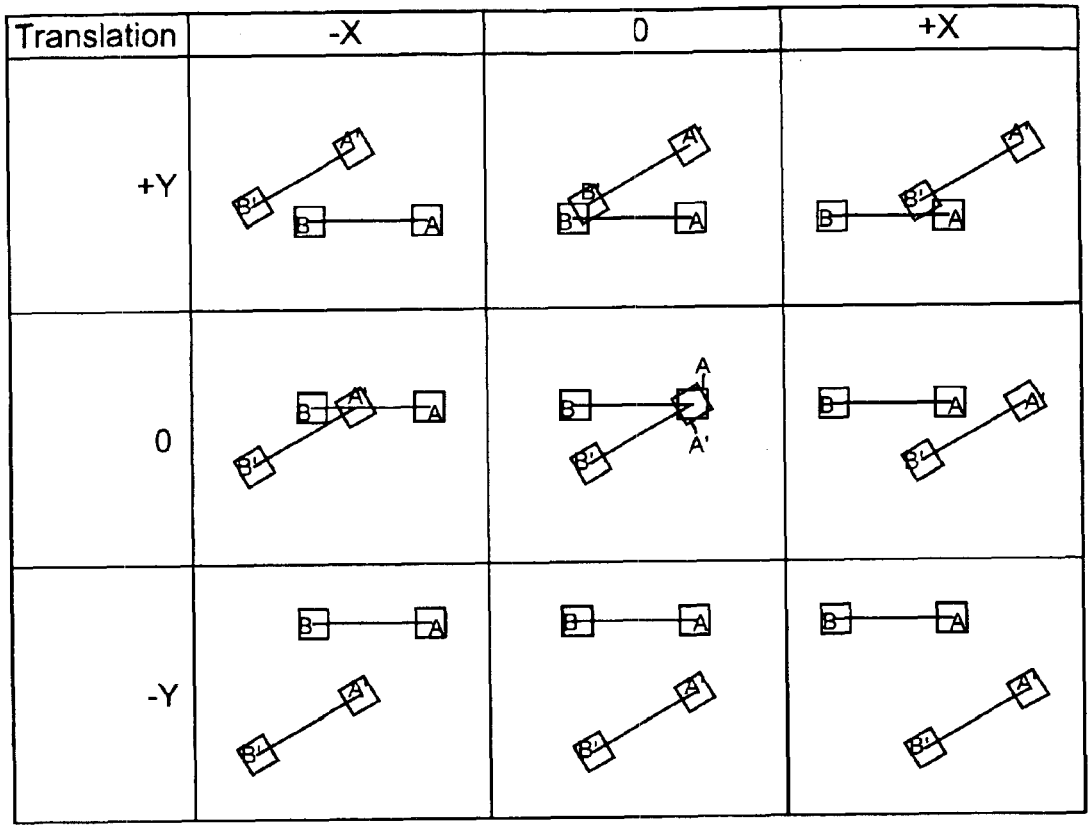
FIG. 22A is a diagram illustrating various translations and positive rotations of a rotation sensor in a horizontal mirror of the second special orientation.
Figure 22B:
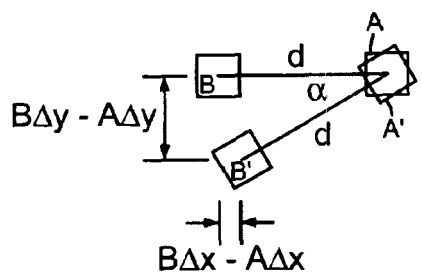
FIG. 22B is a diagram illustrating rotation of the rotation sensor after the translations shown in FIG. 22A have been eliminated.

FIG. 22A is a diagram illustrating various translations and positive rotations of sensors A and B in a horizontal mirror of the second special orientation. The second special orientation in the horizontal mirror alignment is the same as the general orientation in the normal alignment with an alignment angle, $\theta_N$, equal to 90 degrees. FIG. 22B is a diagram illustrating rotation of the rotation sensor after the translations shown in FIG. 22A have been eliminated. The translations shown in FIG. 22A can be eliminated by subtracting the delta motion of sensor A (i.e., A$\Delta$x, A$\Delta$y) from the delta motion of sensor B (i.e., B$\Delta$x, B$\Delta$y). FIG. 22B also shows the distance, d, between sensors A and B, along with the angle of rotation, $\alpha$.

Figure 23A:
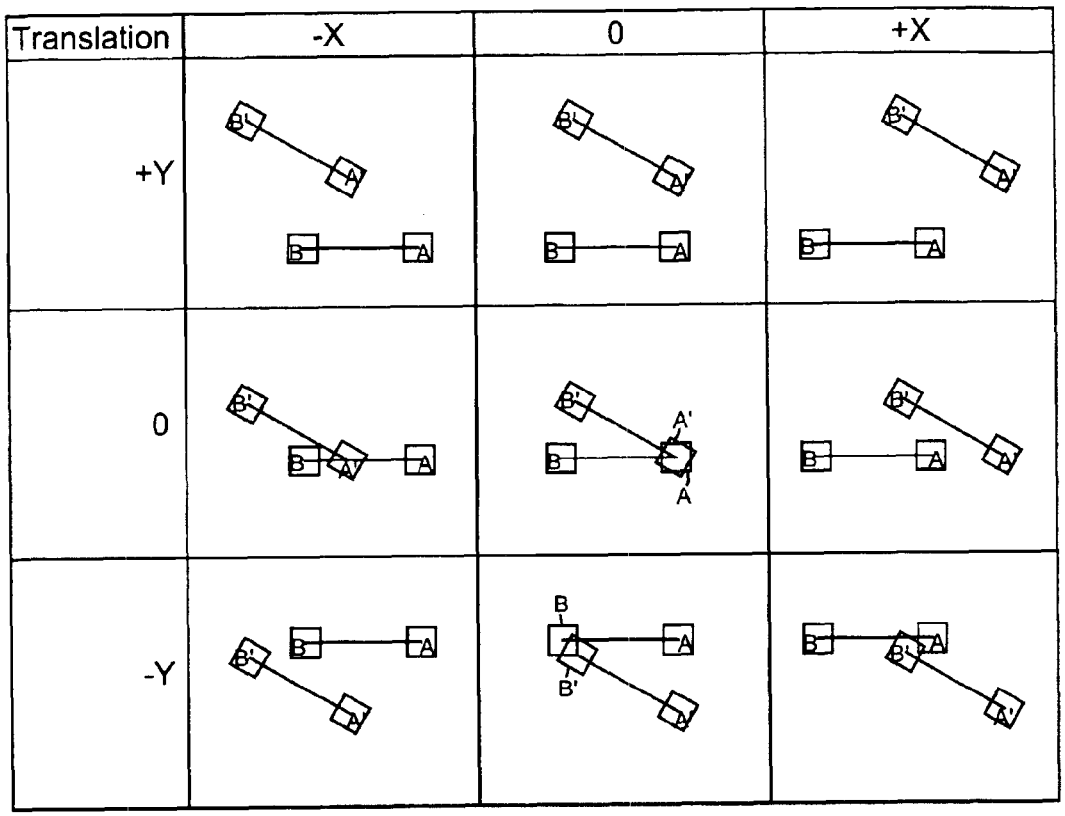
FIG. 23A is a diagram illustrating various translations and negative rotations of a rotation sensor in a horizontal mirror of the second special orientation.
Figure 23B:
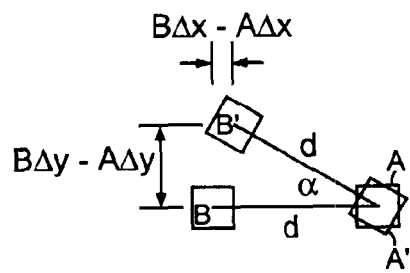
FIG. 23B is a diagram illustrating rotation of the rotation sensor after the translations shown in FIG. 23A have been eliminated.

FIG. 23A is a diagram illustrating various translations and negative rotations of sensors A and B in a horizontal mirror of the second special orientation. FIG. 23B is a diagram illustrating rotation of the rotation sensor after the translations shown in FIG. 23A have been eliminated. The translations shown in FIG. 23A can be eliminated by subtracting the delta motion of sensor A (i.e., A$\Delta$x, A$\Delta$y) from the delta motion of sensor B (i.e., B$\Delta$x, B$\Delta$y). FIG. 23B also shows the distance, d, between sensors A and B, along with the angle of rotation, $\alpha$.

1. Determining the Angle of Rotation

Since the starting axis between sensor A and sensor B is horizontal in the second special orientation, the general formula given in Equation II for the angle of rotation can be simplified. The distance (B$\Delta$y−A$\Delta$y) is perpendicular to the axis between sensors A and B. Since the distance between A and B is known to be d, the angle $\alpha$ can be determined from the following Equation XVIII:

$$\alpha = \sin^{-1}\left(\frac{B\Delta y - A\Delta y}{d}\right) \quad \text{Equation XVIII}$$

The general formula given in Equation II can also be used to determine the angle of rotation for the second special orientation.

2. Determining the Sign of $\alpha$

The appropriate sign of $\alpha$ can be determined for the second special orientation in either the normal or horizontal mirror alignment from the following Table IV:

TABLE IV

| Alignment | Sign of $\alpha$ |
| --- | --- |
| Normal | sign of (B$\Delta$y − A$\Delta$y) |
| Horizontal Mirror | inverse sign of (B$\Delta$y − A$\Delta$y) |

D. Third Special Orientation

Figure 24A:
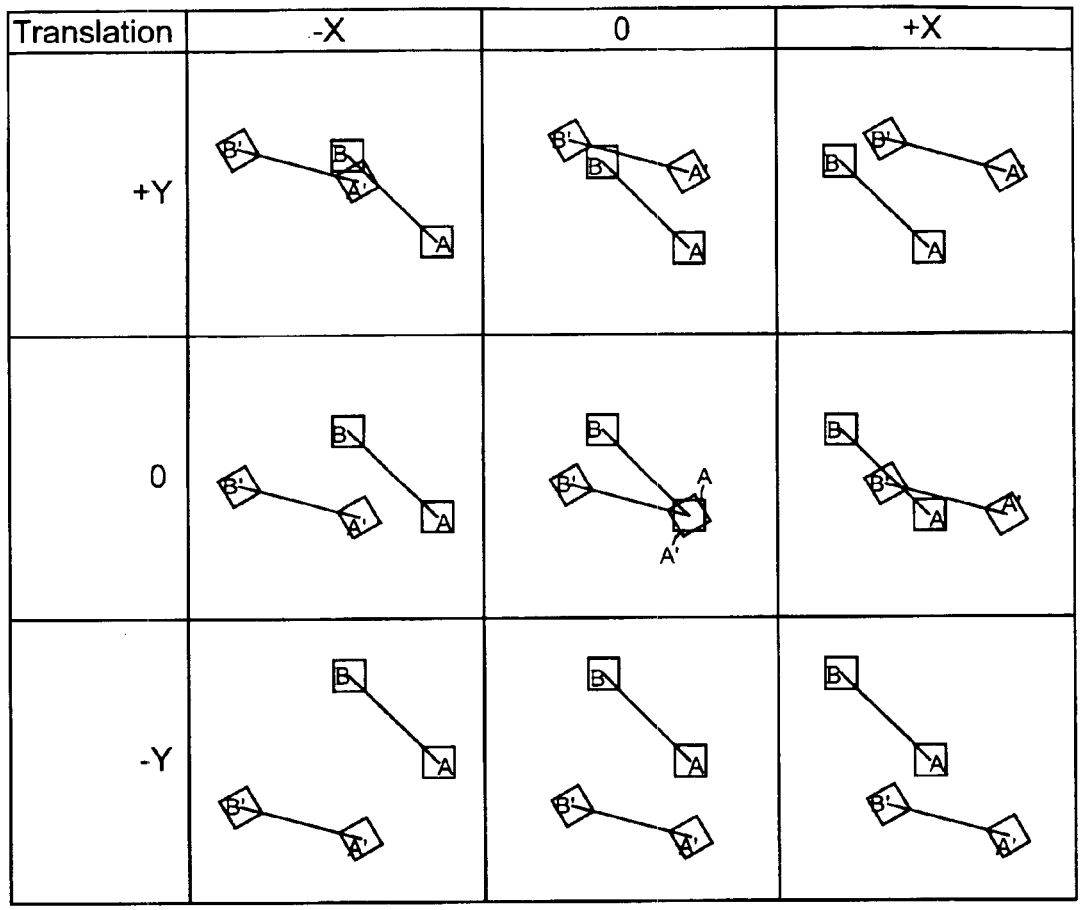
FIG. 24A is a diagram illustrating various translations and positive rotations of a rotation sensor in a third special orientation.

FIG. 24A is a diagram illustrating various translations and positive rotations of sensors A and B in the third special orientation. In the third special orientation, sensors A and B are orientated so that the "x" and "y" motion reports from both sensors are in the same direction. Sensor B is located to the left of sensor A at an X distance of $-d/(2)^{(1/2)}$, and up from sensor A at a Y distance of $d/(2)^{(1/2)}$. The third special orientation in the normal alignment is the same as the general orientation in the normal alignment with an alignment angle, $\theta_N$, equal to 45 degrees.

Figure 24B:
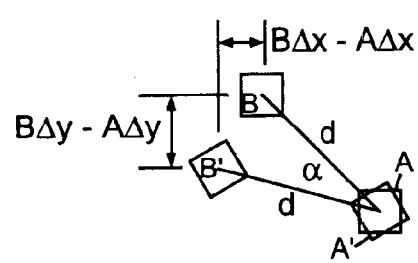
FIG. 24B is a diagram illustrating rotation of the rotation sensor after the translations shown in FIG. 24A have been eliminated.

FIG. 24B is a diagram illustrating rotation of the rotation sensor after the translations shown in FIG. 24A have been eliminated. The translations shown in FIG. 24A can be eliminated by subtracting the delta motion of sensor A (i.e., A$\Delta$x, A$\Delta$y) from the delta motion of sensor B (i.e., B$\Delta$x, B$\Delta$y). FIG. 24B also shows the distance, d, between sensors A and B, along with the angle of rotation, $\alpha$.

Figure 25A:
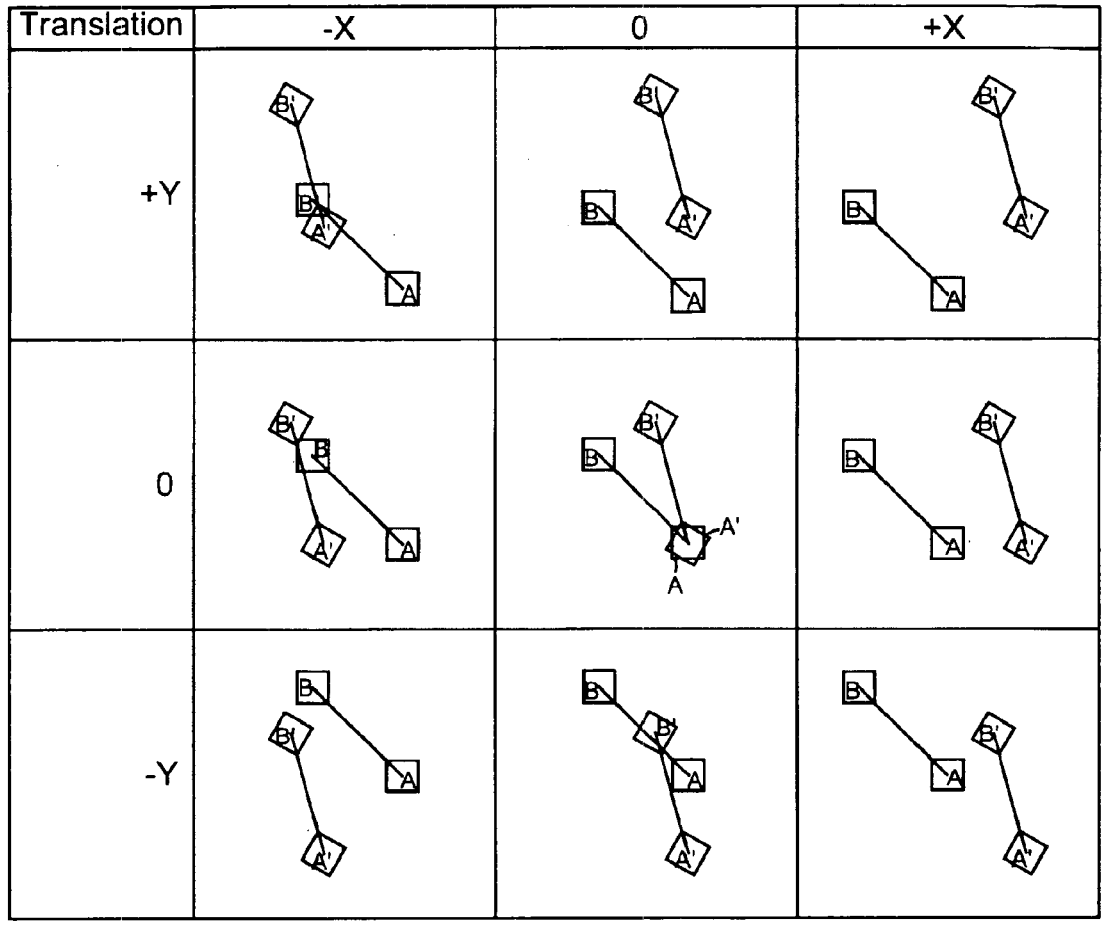
FIG. 25A is a diagram illustrating various translations and negative rotations of a rotation sensor in a third special orientation.
Figure 25B:
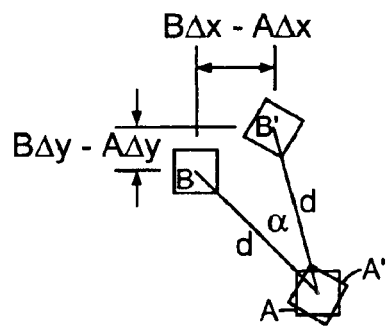
FIG. 25B is a diagram illustrating rotation of the rotation sensor after the translations shown in FIG. 25A have been eliminated.

FIG. 25A is a diagram illustrating various translations and negative rotations of sensors A and B in the third special orientation. FIG. 25B is a diagram illustrating rotation of the rotation sensor after the translations shown in FIG. 25A have been eliminated. The translations shown in FIG. 25A can be eliminated by subtracting the delta motion of sensor A (i.e., A$\Delta$x, A$\Delta$y) from the delta motion of sensor B (i.e., B$\Delta$x, B$\Delta$y). FIG. 25B also shows the distance, d, between sensors A and B, along with the angle of rotation, $\alpha$.

Figure 26A:
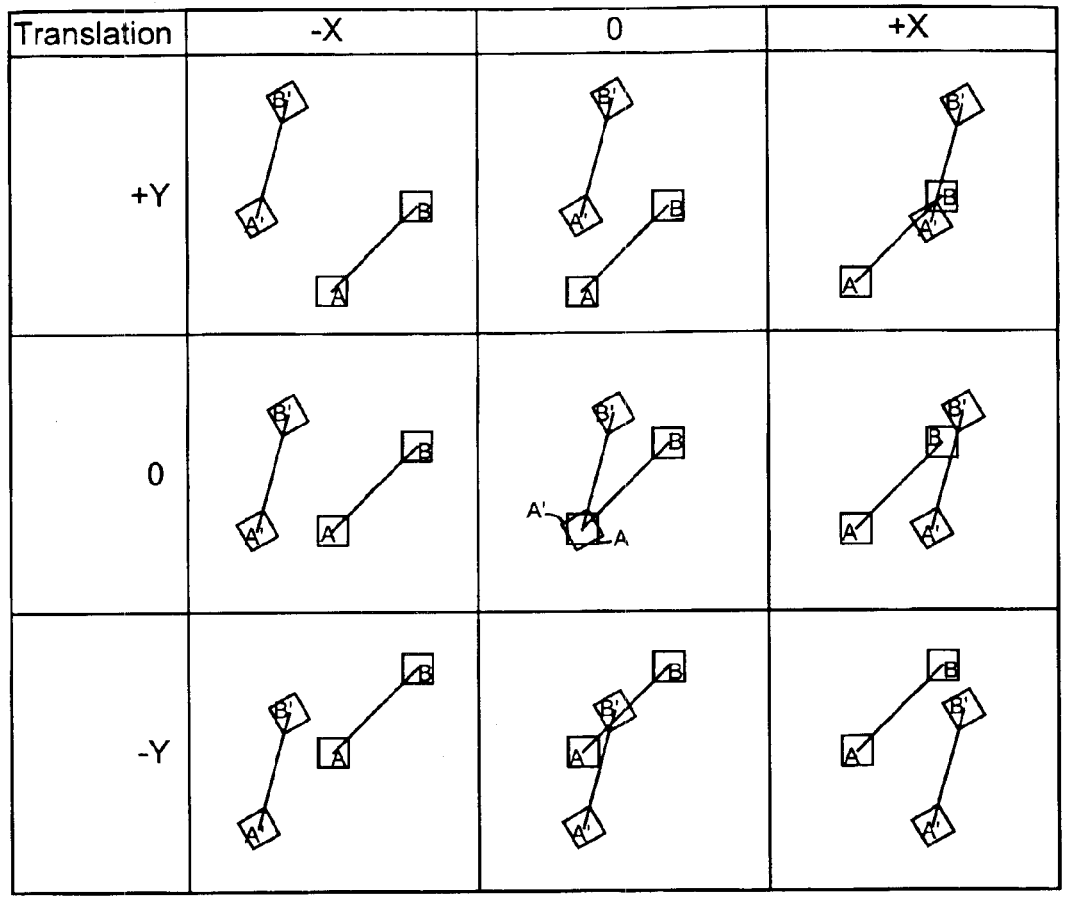
FIG. 26A is a diagram illustrating various translations and positive rotations of a rotation sensor in a horizontal mirror of the third special orientation.

FIG. 26A is a diagram illustrating various translations and positive rotations of sensors A and B in a horizontal mirror of the third special orientation. The third special orientation in the horizontal mirror alignment is the same as the general orientation in the normal alignment with an alignment angle, $\theta_N$, equal to 315 degrees.

Figure 26B:
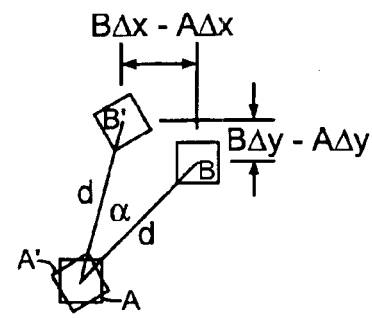
FIG. 26B is a diagram illustrating rotation of the rotation sensor after the translations shown in FIG. 26A have been eliminated.

FIG. 26B is a diagram illustrating rotation of the rotation sensor after the translations shown in FIG. 26A have been eliminated. The translations shown in FIG. 26A can be eliminated by subtracting the delta motion of sensor A (i.e., A$\Delta$x, A$\Delta$y) from the delta motion of sensor B (i.e., B$\Delta$x, B$\Delta$y). FIG. 26B also shows the distance, d, between sensors A and B, along with the angle of rotation, $\alpha$.

Figure 27A:
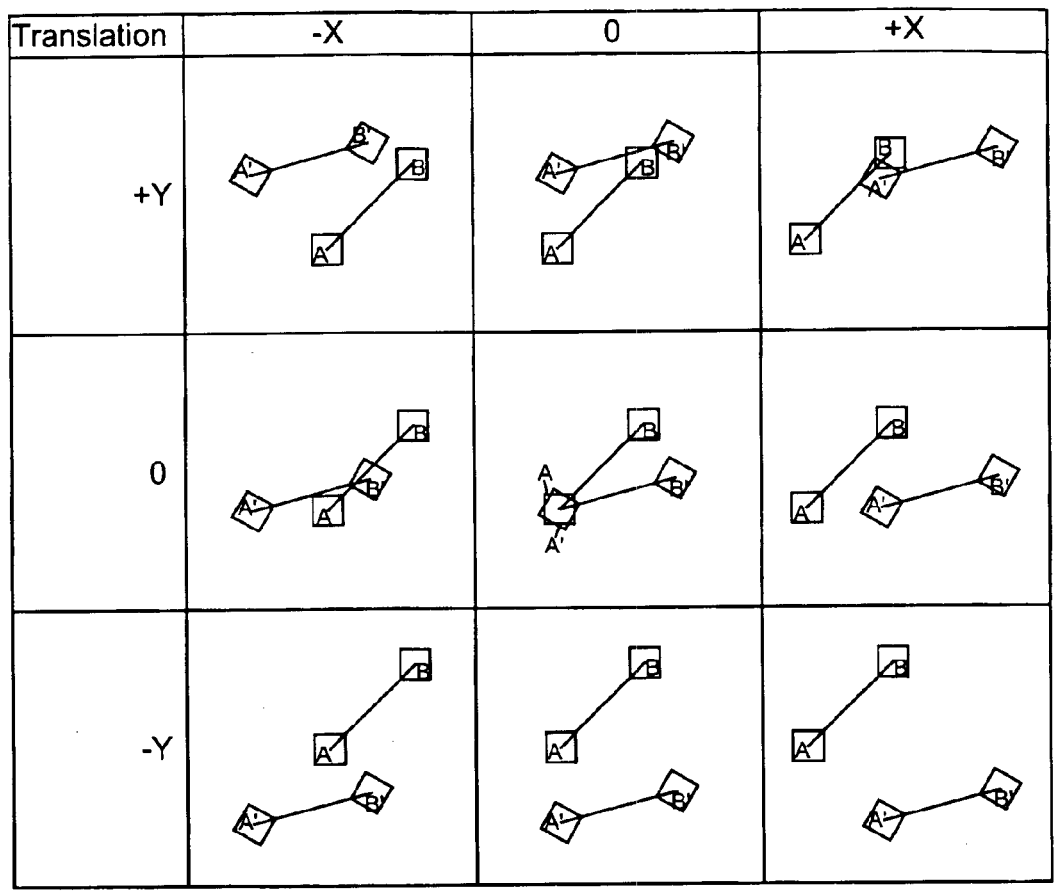
FIG. 27A is a diagram illustrating various translations and negative rotations of a rotation sensor in a horizontal mirror of the third special orientation.
Figure 27B:
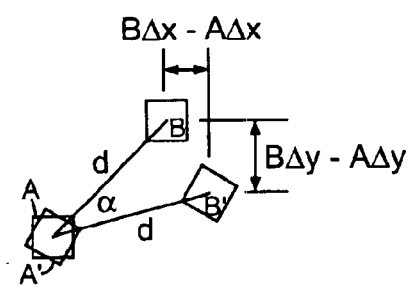
FIG. 27B is a diagram illustrating rotation of the rotation sensor after the translations shown in FIG. 27A have been eliminated.

FIG. 27A is a diagram illustrating various translations and negative rotations of sensors A and B in a horizontal mirror of the third special orientation. FIG. 27B is a diagram illustrating rotation of the rotation sensor after the translations shown in FIG. 27A have been eliminated. The translations shown in FIG. 27A can be eliminated by subtracting the delta motion of sensor A (i.e., A$\Delta$x, A$\Delta$y) from the delta motion of sensor B (i.e., B$\Delta$x, B$\Delta$y). FIG. 27B also shows the distance, d, between sensors A and B, along with the angle of rotation, $\alpha$.

Figure 28A:
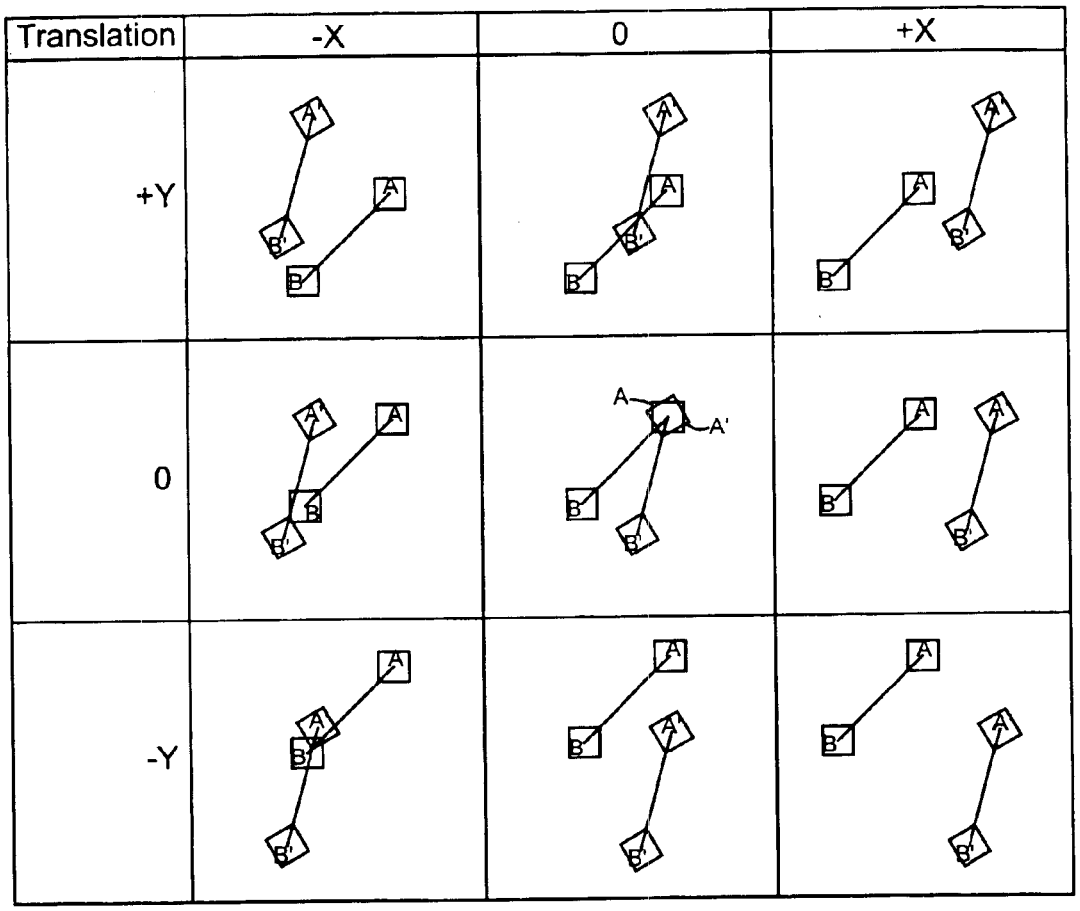
FIG. 28A is a diagram illustrating various translations and positive rotations of a rotation sensor in a vertical mirror of the third special orientation.

FIG. 28A is a diagram illustrating various translations and positive rotations of sensors A and B in a vertical mirror of the third special orientation. The third special orientation in the vertical mirror alignment is the same as the general orientation in the normal alignment with an alignment angle, $\theta_N$, equal to 135 degrees.

Figure 28B:
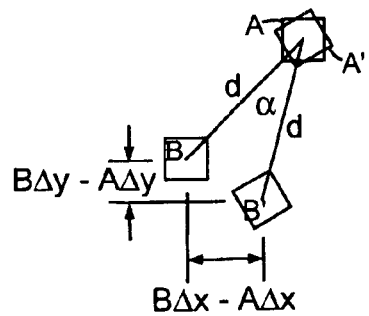
FIG. 28B is a diagram illustrating rotation of the rotation sensor after the translations shown in FIG. 28A have been eliminated.

FIG. 28B is a diagram illustrating rotation of the rotation sensor after the translations shown in FIG. 28A have been eliminated. The translations shown in FIG. 28A can be eliminated by subtracting the delta motion of sensor A (i.e., A$\Delta$x, A$\Delta$y) from the delta motion of sensor B (i.e., B$\Delta$x, B$\Delta$y). FIG. 28B also shows the distance, d, between sensors A and B, along with the angle of rotation, $\alpha$.

Figure 29A:
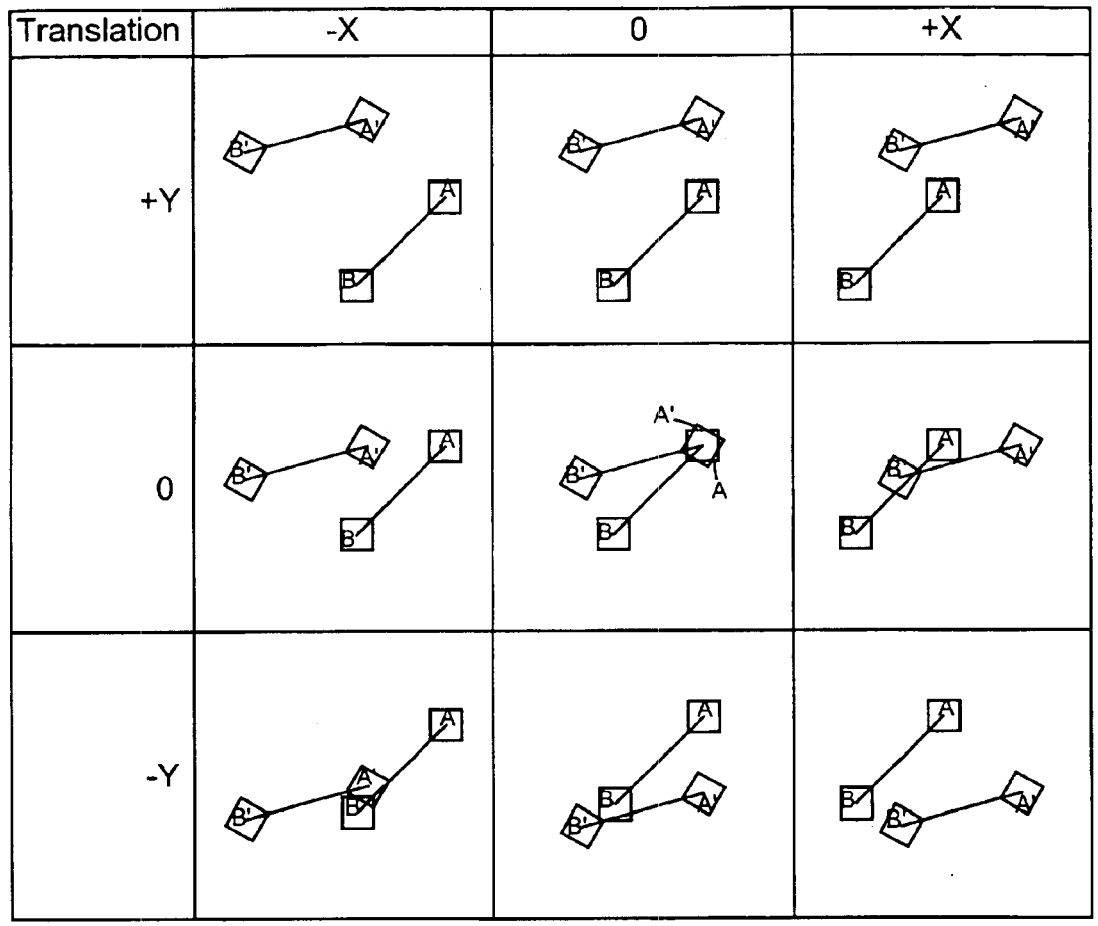
FIG. 29A is a diagram illustrating various translations and negative rotations of a rotation sensor in a vertical mirror of the third special orientation.
Figure 29B:
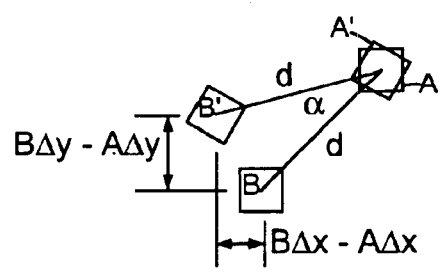
FIG. 29B is a diagram illustrating rotation of the rotation sensor after the translations shown in FIG. 29A have been eliminated.

FIG. 29A is a diagram illustrating various translations and negative rotations of sensors A and B in a vertical mirror of the third special orientation. FIG. 29B is a diagram illustrating rotation of the rotation sensor after the translations shown in FIG. 29A have been eliminated. The translations shown in FIG. 29A can be eliminated by subtracting the delta motion of sensor A (i.e., A$\Delta$x, A$\Delta$y) from the delta motion of sensor B (i.e., B$\Delta$x, B$\Delta$y). FIG. 29B also shows the distance, d, between sensors A and B, along with the angle of rotation, α.

Figure 30A:
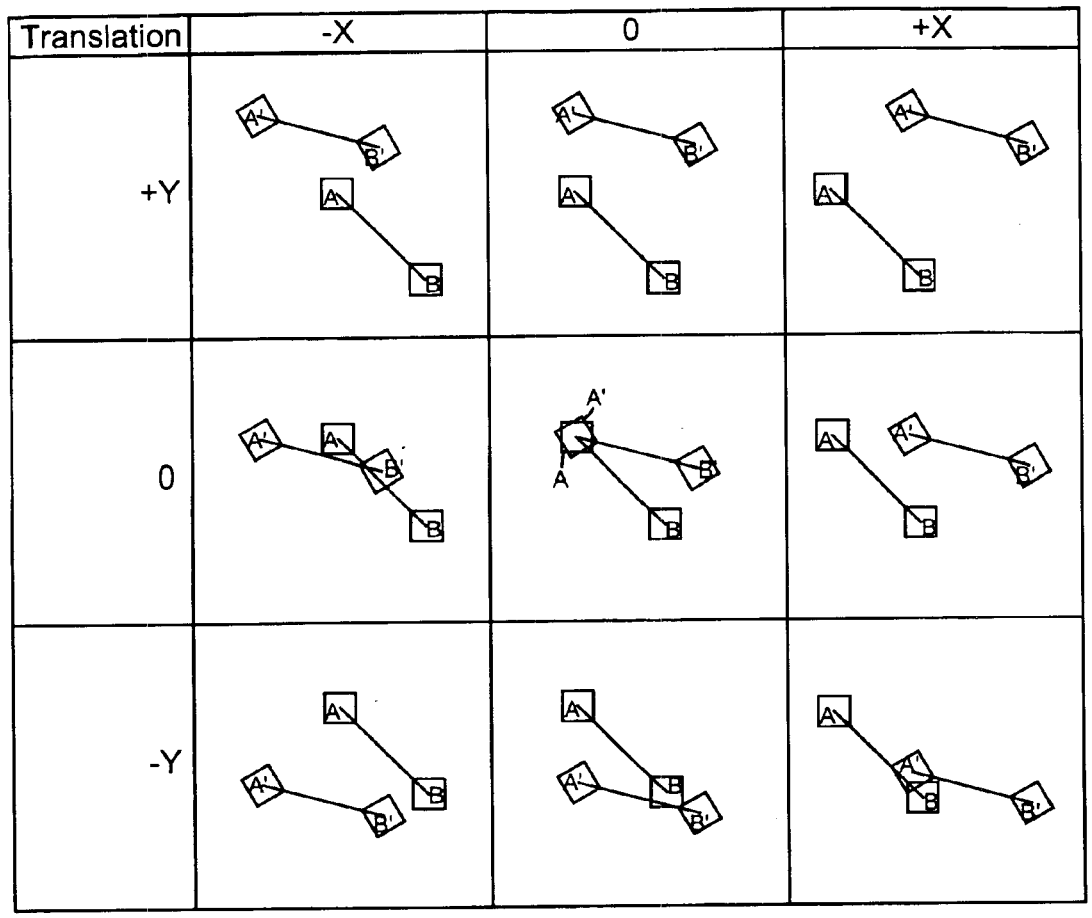
FIG. 30A is a diagram illustrating various translations and positive rotations of a rotation sensor in a horizontal and vertical mirror of the third special orientation.

FIG. 30A is a diagram illustrating various translations and positive rotations of sensors A and B in a horizontal and vertical mirror of the third special orientation. The third special orientation in the horizontal and vertical mirror alignment is the same as the general orientation in the normal alignment with an alignment angle, $\theta_N$, equal to 225 degrees.

Figure 30B:
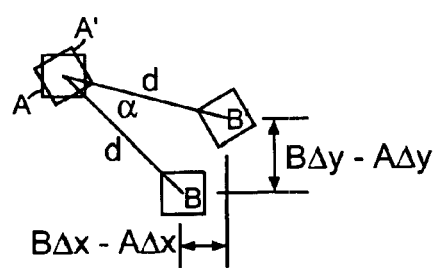
FIG. 30B is a diagram illustrating rotation of the rotation sensor after the translations shown in FIG. 30A have been eliminated.

FIG. 30B is a diagram illustrating rotation of the rotation sensor after the translations shown in FIG. 30A have been eliminated. The translations shown in FIG. 30A can be eliminated by subtracting the delta motion of sensor A (i.e., AΔx, AΔy) from the delta motion of sensor B (i.e., BΔx, BΔy). FIG. 30B also shows the distance, d, between sensors A and B, along with the angle of rotation, α.

Figure 31A:
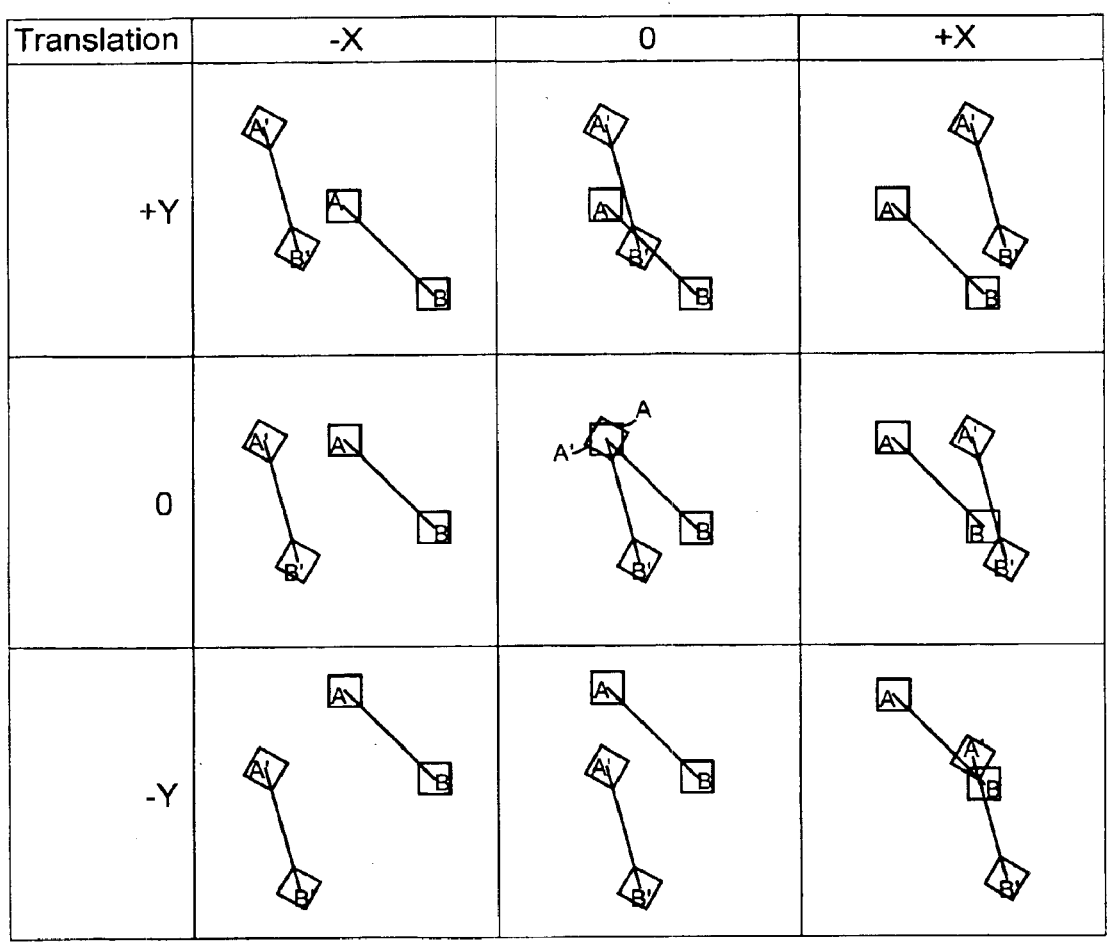
FIG. 31A is a diagram illustrating various translations and negative rotations of a rotation sensor in a horizontal and vertical mirror of the third special orientation.
Figure 31B:
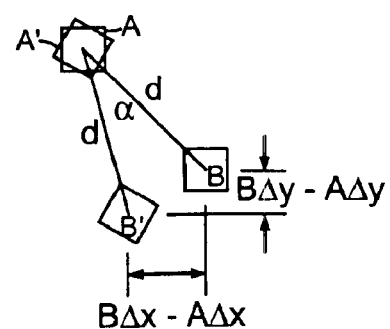
FIG. 31B is a diagram illustrating rotation of the rotation sensor after the translations shown in FIG. 31A have been eliminated.

FIG. 31A is a diagram illustrating various translations and negative rotations of sensors A and B in a horizontal and vertical mirror of the third special orientation. FIG. 31B is a diagram illustrating rotation of the rotation sensor after the translations shown in FIG. 31A have been eliminated. The translations shown in FIG. 31A can be eliminated by subtracting the delta motion of sensor A (i.e., AΔx, AΔy) from the delta motion of sensor B (i.e., BΔx, BΔy). FIG. 31B also shows the distance, d, between sensors A and B, along with the angle of rotation, α.

1. Determining the Angle of Rotation

The general formula given in Equation II can be used to determine the angle of rotation for the third special orientation.

2. Determining the Sign of α

The appropriate sign of α, can be determined for the third special orientation in the normal, horizontal mirror, vertical mirror, and horizontal and vertical mirror alignments from the following Table V:

TABLE V

| Alignment | Sign of α |
|---|---|
| Normal | inverse sign of (BΔx − AΔx) |
| Horizontal Mirror | inverse sign of (BΔx − AΔx) |
| Vertical Mirror | sign of (BΔx − AΔx) |
| Horizontal and Vertical Mirror | sign of (BΔx − AΔx) |

V. Center of Rotation

The center of rotation of sensors A and B can be determined using the angle of rotation, and the beginning and final positions of sensors A and B. For a beginning position, (x, y), that is rotated by an angle a to a new position (x', y') around an arbitrary center of rotation point $(x_0, y_0)$, the following Equation XIX provides a relationship for the rotation and translation of a set of Cartesian coordinates:

$$(x', y') = (x_0, y_0) + \begin{bmatrix} \cos\alpha & -\sin\alpha \\ \sin\alpha & \cos\alpha \end{bmatrix}(x - x_0, y - y_0) \quad \text{Equation XIX}$$

Expanding the terms in Equation X results in the following Equations XX and XXI for x' and y', respectively, which is the final position:

$$x' = x_0 + x\cos\alpha - x_0\cos\alpha - y\sin\alpha + y_0\sin\alpha \quad \text{Equation XX}$$

$$y' = y_0 + x\sin\alpha - x_0\sin\alpha + y\cos\alpha - y_0\cos\alpha \quad \text{Equation XXI}$$

Since the beginning point, (x, y), the final point, (x', y'), and the angle α are known, the rotation point $(x_0, y_0)$ can be determined by rearranging Equations XX and XXI to arrive at the following Equations XXII and XXIII:

$$x_0 = \frac{y - y' + x'\sin\alpha + x\sin\alpha + y\cos\alpha - y'\cos\alpha}{2\sin\alpha} \quad \text{Equation XXII}$$

$$y_0 = \frac{x' - x - x\cos\alpha + x'\cos\alpha + y\sin\alpha + y'\sin\alpha}{2\sin\alpha} \quad \text{Equation XXIII}$$

Since the original position, (x, y), of sensor A is the origin, (0,0), Equations XXII and XXIII can be simplified to the following Equations XXIV and XXV, respectively:

$$x_0 = \frac{-y' + x'\sin\alpha + -y'\cos\alpha}{2\sin\alpha} \quad \text{Equation XXIV}$$

$$y_0 = \frac{x' + x'\cos\alpha + y'\sin\alpha}{2\sin\alpha} \quad \text{Equation XXV}$$

VI. Rotation Sensor Implementations

The two navigation sensors A and B can be implemented as two separate sensors, oriented in the same direction, separated by a distance that is equal to or greater than the sensor package size. Increasing the distance between sensors A and B will result in a larger system sensor, but greater sensitivity to slower rotations. The first and second special orientations are the easiest to implement.

Figure 32:
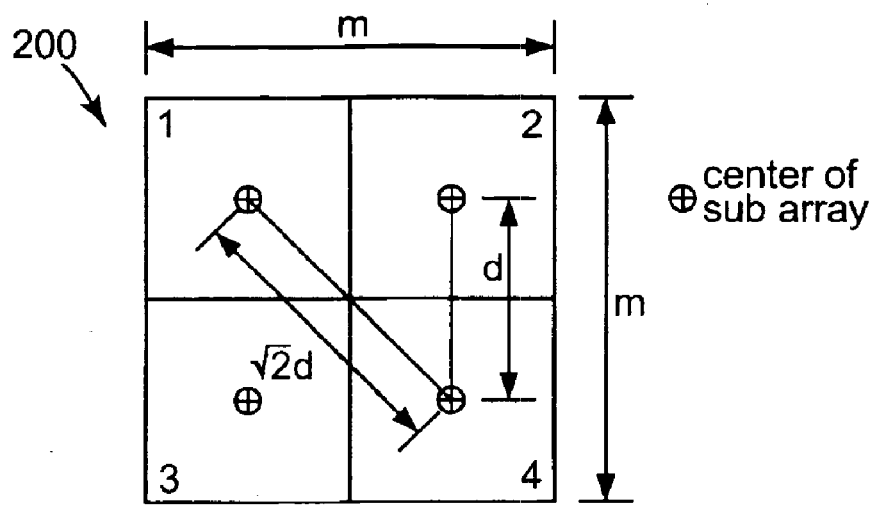
FIG. 32 is a diagram of a sensor array divided into four sub arrays, which are suitable for implementing various embodiments of the present invention.

The two sensors A and B can also be integrated into one sensor die, with sensor A and sensor B being subsets of the entire sensor. For example, FIG. 32 is a diagram of a sensor array 200 divided into four sub arrays, which are suitable for implementing various embodiments of the present invention. As shown in FIG. 32, sensor array 200 has a length and width of magnitude "m," and is divided into four sub arrays, numbered 1, 2, 3 and 4. The distance, d, between the centers of the sub arrays is m/2 for the 1–2, 1–3, 2–4 and 3–4 sub array combinations. The distance, d, is 1.414*(m/2) for the 1–4 and 3–2 combinations. Thus, the third special orientation, which would use either sub arrays 1 and 4, or sub arrays 2 and 3, provides the greatest separation between sensors in this embodiment.

Table VI below shows all of the possible two sub array combinations of sensor array 200, along with the corresponding special orientations and alignments of sensors A and B.

TABLE VI

| Sensor "A" | Sensor "B" | Orientation | Alignment |
|---|---|---|---|
| 1 | 2 | #2 | Normal |
| 2 | 1 | #2 | Horizontal mirror |
| 1 | 3 | #1 | Vertical mirror |
| 3 | 1 | #1 | Normal |
| 1 | 4 | #3 | Horizontal and Vertical mirror |
| 4 | 1 | #3 | Normal |
| 2 | 3 | #3 | Vertical mirror |
| 3 | 2 | #3 | Horizontal mirror |
| 2 | 4 | #1 | Vertical mirror |
| 4 | 2 | #1 | Normal |
| 3 | 4 | #2 | Normal |
| 4 | 3 | #2 | Horizontal mirror |

Figure 33:
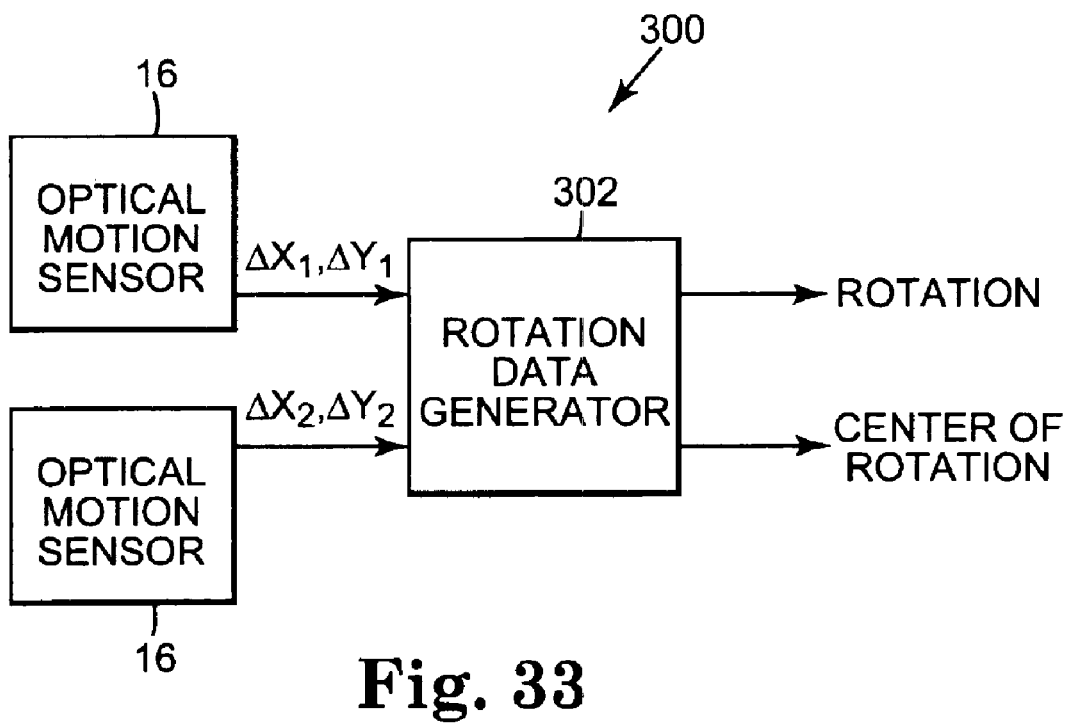
FIG. 33 is a block diagram of a rotation sensor according to one embodiment of the present invention.

FIG. 33 is a block diagram of a rotation sensor 300 according to one embodiment of the present invention. Rotation sensor 300 includes two optical motion sensors 16 (described above), and a rotation data generator 302. The two optical motion sensors 16 correspond to sensors A and B, and may be positioned in any of the various orientations and alignments shown in FIG. 3.

The two optical motion sensors 16 each output Δx and Δy data to rotation data generator 302. Based on the Δx and Δy data received from the two sensors 16, and on stored information regarding the particular orientation, alignment and separation of the two sensors 16, rotation data generator 302 calculates rotation data and center of rotation data as described above, and outputs this data. In one embodiment, the rotation data represents rotation about the sensor 16 corresponding to sensor A (with positive rotation being defined as counterclockwise), and the center of rotation data represents the (x, y) coordinates of the center of rotation of the two sensors 16 relative to the origin, wherein the origin is the original location of the sensor 16 corresponding to sensor A.

In one form of the invention, the frame of reference should not rotate more than about ten degrees between frames for good correlation to determine Δx and Δy movement. In one embodiment, the equations shown above are valid for a range of ±90 degrees or 0 to 180 degrees, but the maximum rotation between frames should be less than 10 degrees.

Current optical navigation sensors 16 typically operate in the range of 1500 to 2000 frames per second. The actual report rate to a computer or other device is typically between 100 to 200 reports per second. Due to the difference between the measurement rate and the report rate, the Δx and Δy information is accumulated and then output.

The maximum rotation speed of rotation sensor 300 is determined by the angle that the sensor 300 can be rotated before the correlation between frames degrades to the point where good (X, Y) navigation begins to fail. Assuming that a rotation of 10 degrees occurs between frames, with a frame rate of 1500 frames per second, the maximum rotation is 41.6 revolutions per second, or 2500 rpm.

The minimum rotation speed is the speed that results in a minimum Δx and Δy count between the sensors 16. This is dependent upon the frame rate and the distance between sensors 16. If the distance between sensors 16 is increased, the minimum rotation speed that can be seen is lowered. Since the navigation sensors 16 typically only report data between 100 to 200 times per second, Δx and Δy counts should be accumulated over a number of frames.

Due to the fact that, in one embodiment, the rotation data is determined from the Δx and the Δy values, and the fact that the Δx and Δy values typically have noise in them, the rotation data is filtered (i.e., averaged, smoothed, weighed filters) in one form of the invention to dampen the changes in the rotation data and provide improved noise performance.

It will be understood by a person of ordinary skill in the art that functions performed by rotation sensor 300 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

The two sensors 16 and rotation data generator 302 can be implemented as a single integrated circuit package or as separate packages. In alternative embodiments, rotation data generator 302 may be incorporated in an external device, such as a computer or other electronic device.

Although an optical motion sensor 16 has been discussed above in the context of an optical mouse, it will be understood that embodiments of the present invention are not limited to an optical mouse, and that the techniques described herein are also applicable to other devices where rotation sensing is desired, such as in game controllers, gestural controllers, personal digital assistant (PDA) devices, cellular telephones, or other devices.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus for sensing rotation comprising:
   a plurality of motion sensors constructed in a substantially coplanar arrangement in a first plane and implemented in a single integrated circuit package, the plurality of motion sensors each configured to generate incremental movement data indicative of movement of the sensor in two dimensions parallel to the first plane; and
   a rotation data generator for generating rotation data based on the incremental movement data and stored sensor configuration data, the sensor configuration data including orientation data representing an orientation of the plurality of motion sensors and including distance information representing a distance between the plurality of motion sensors, the rotation data representing rotation of the apparatus parallel to the first plane.

2. The apparatus of claim 1, wherein the rotation data includes an angle of rotation value, and wherein the sign of the angle of rotation value is indicative of a direction of rotation.

3. The apparatus of claim 1, wherein the rotation data includes a center of rotation value.

4. The apparatus of claim 1, wherein the plurality of motion sensors are each a subset of a single motion sensor.

5. The apparatus of claim 1, wherein the motion sensors are optical motion sensors.

6. A method of sensing rotational movement comprising:
   providing a two-dimensional array of photo detectors;
   directing images onto first and second portions of the array, the first portion different from the second portion;
   digitizing outputs of the photo detectors in the first and the second portions, thereby generating digital representations of the images;
   correlating the digital representations of the images;
   generating first and second sets of translation data based on the correlation, the first and second sets of translation data indicative of translation in two dimensions of the first and the second portions, respectively; and
   generating rotation data based on the translation data, the rotation data indicative of rotation of the two-dimensional array.

7. The method of claim 6, wherein the first and the second portions are substantially coplanar.

8. The method of claim 6, wherein the rotation data includes an angle of rotation value, and wherein the sign of the angle of rotation value is indicative of a direction of rotation of the two-dimensional array.

9. The method of claim 6, wherein the rotation data includes a center of rotation value.

10. The method of claim 6, and further comprising:
   storing array configuration data; and
   wherein the rotation data is generated based on the translation data and on the stored array configuration data.

11. The method of claim 10, wherein the array configuration data includes orientation data representing an orientation of the first and the second portions.

12. The method of claim 10, wherein the array configuration data includes separation information representing a distance between the first and the second portions.

13. The method of claim 6, wherein the translation data is incremental X and Y translation data.

14. An apparatus for sensing rotation comprising:
   a movable motion sensor comprising a first and a second two-dimensional array of photo detectors configured in a coplanar arrangement in a first plane, wherein the first and the second arrays are each different subsets of a single two-dimensional array of photo detectors, the motion sensor configured to generate digital representations of images directed onto the first and the second arrays, and to generate first and second sets of two-dimensional movement data based on the digital representations of the images, the first and second sets of movement data indicative of individual motion of the first and the second arrays, respectively, parallel to the first plane; and
   a controller for processing the movement data to determine rotation information indicative of rotation of the motion sensor parallel to the first plane.

15. The apparatus of claim 14, wherein the rotation information includes an angle of rotation value, and wherein the sign of the angle of rotation value is indicative of a direction of rotation of the first array about the second array.

16. The apparatus of claim 14, wherein the rotation information includes center of rotation information.

17. The apparatus of claim 14, wherein the controller determines the rotation information based on the movement data and on stored sensor configuration data.

18. The apparatus of claim 17, wherein the sensor configuration data includes orientation data representing an orientation of the first and the second arrays.

19. The apparatus of claim 17, wherein the sensor configuration data includes distance information representing a distance between the first and the second arrays.

20. The apparatus of claim 14, wherein the movement data is delta-X and delta-Y data.

21. An apparatus for sensing rotation comprising:
   a plurality of motion sensors constructed in a substantially coplanar arrangement in a first plane and implemented in a single integrated circuit package, the plurality of motion sensors each configured to generate incremental movement data indicative of movement of the sensor in two dimensions parallel to the first plane; and
   a rotation data generator for generating rotation data based on the incremental movement data, the rotation data representing rotation of the apparatus parallel to the first plane.

22. The apparatus of claim 21, wherein the rotation data includes an angle of rotation value, and wherein the sign of the angle of rotation value is indicative of a direction of rotation.

23. The apparatus of claim 21, wherein the rotation data includes a center of rotation value.

24. The apparatus of claim 21, wherein the rotation data generator generates the rotation data based on the incremental movement data and on stored sensor configuration data.

25. The apparatus of claim 24, wherein the sensor configuration data includes orientation data representing an orientation of the plurality of motion sensors.

26. The apparatus of claim 24, wherein the sensor configuration data includes distance information representing a distance between the plurality of motion sensors.

27. The apparatus of claim 21, wherein the plurality of motion sensors are each a subset of a single motion sensor.

28. The apparatus of claim 21, wherein the motion sensors are optical motion sensors.

* * * * *